Figure 5:
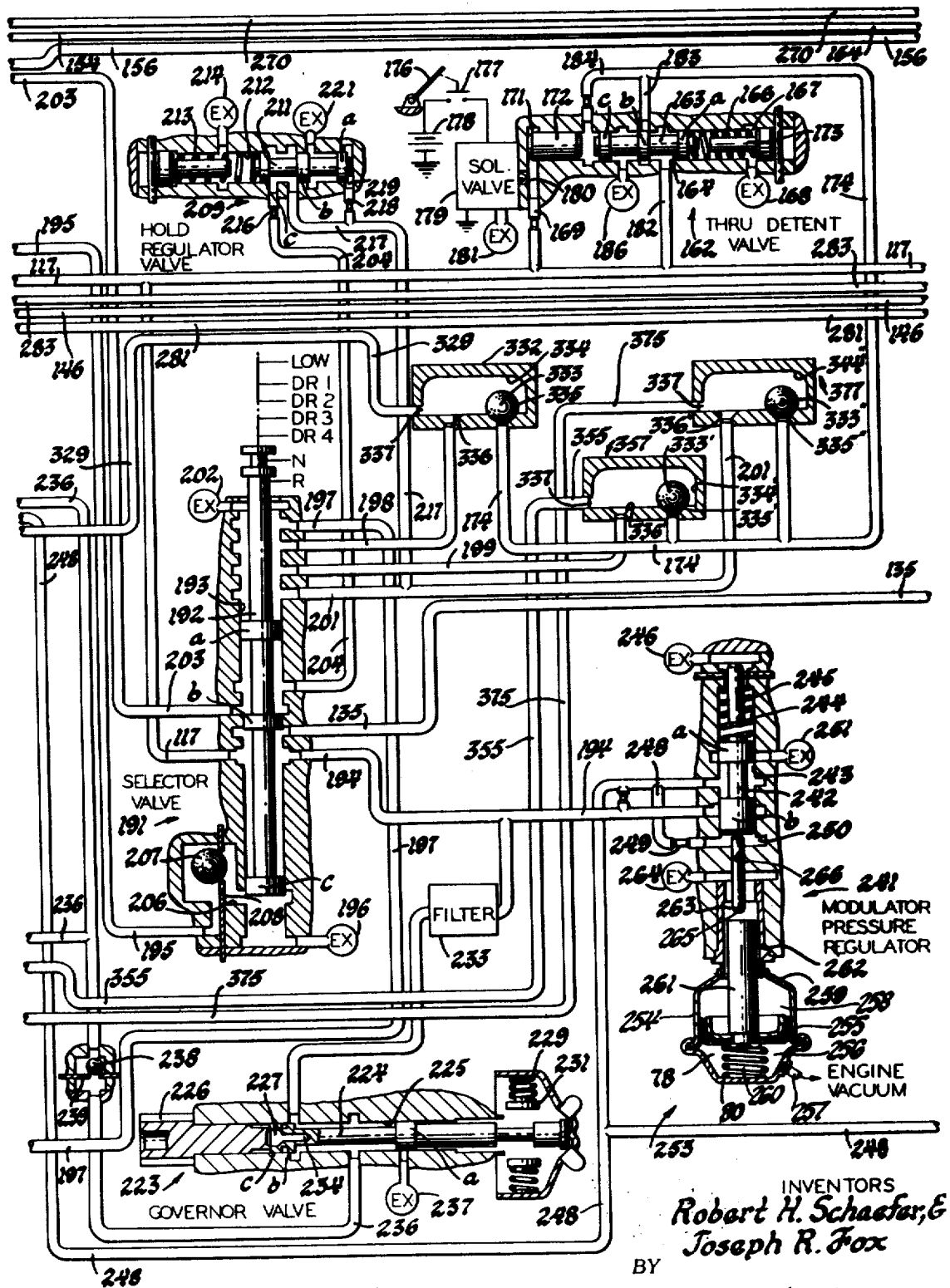

United States Patent

Schaefer et al.

[15] 3,691,872
[45] Sept. 19, 1972

[54] TRANSMISSION AND CONTROLS

[72] Inventors: Robert H. Schaefer, Westfield, Ind.; Joseph R. Fox, Waukesha, Wis.

[73] Assignee: General Motors Corporation, Detroit, Mich.

[22] Filed: April 29, 1971

[21] Appl. No.: 138,655

Related U.S. Application Data

[63] Continuation-in-part of Ser. No. 852,760, Aug. 25, 1969, abandoned.

[52] U.S. Cl. .......................74/864, 74/645, 74/731, 74/869, 192/3.29, 192/109 F
[51] Int. Cl........B60k 21/06, F16h 5/48, F16h 47/08
[58] Field of Search................................74/864, 869

[56] References Cited

UNITED STATES PATENTS

| | | | |
|---|---|---|---|
| 3,025,723 | 3/1962 | Miller | 74/DIG. 1 |
| 3,078,736 | 2/1963 | Meads et al. | 74/752 X |
| 3,255,642 | 6/1966 | Christenson et al. | 74/869 X |
| 3,336,815 | 8/1967 | Leonard | 74/869 X |
| 3,387,508 | 6/1968 | Searles et al. | 74/864 |
| 3,400,612 | 9/1968 | Pierce, Jr. | 74/864 |
| 3,452,621 | 7/1969 | Golan et al. | 74/752 |
| 3,505,907 | 4/1970 | Fox et al. | 74/753 |
| 3,541,887 | 11/1970 | Van Lent et al. | 74/869 X |
| 3,625,090 | 12/1971 | Chana | 74/864 |
| 3,656,372 | 4/1972 | Chana | 74/753 |

Primary Examiner—Carlton R. Croyle
Assistant Examiner—Thomas C. Perry
Attorney—W. E. Finken and A. M. Heiter

[57] ABSTRACT

A transmission having a multiratio gear unit providing five forward speeds established by the engagement of a forward drive clutch and one additional individual speed engaging device for each forward speed and a reverse drive by the engagement of the second and fourth forward speed devices for reverse drive. A manual selector valve for selecting and holding in a first speed drive, selecting a range providing speed and torque demand controlled automatic shifting between four speeds, second to fifth and selecting further lower ranges each preventing normal automatic shifting to the highest speed in the next higher range but permitting shifts to all available higher speeds at higher than normal overrun speeds. For each speed an automatic shift valve controls a relay valve. The relay valves are hydraulically sequentially arranged so each lower speed relay valve when upshifted feeds through the downshifted next higher speed relay valve to feed the motor to engage the next speed ratio drive. The relay valves each have low and high inlet, supply and exhaust ports. In the downshift position the low inlet port is connected to the low supply port and the high supply port is connected to the high exhaust. In the upshift position the high inlet port is connected to the high supply port and the low supply port is connected to low exhaust. The second and higher relay valves have a low inlet port having a restricted feed and a one-way bypass return. Thus each speed drive motor is fed for each speed drive engagement through its restricted feed passage on both up and down shifts and each speed drive motor is exhausted for speed drive disengagement through one restricted exhaust passage on upshifts and another restricted exhaust passage on downshifts to provide individually controlled motor feed and thus engagement rates and individually controlled exhaust rates at one rate during upshift and another rate during downshifts.

36 Claims, 6 Drawing Figures

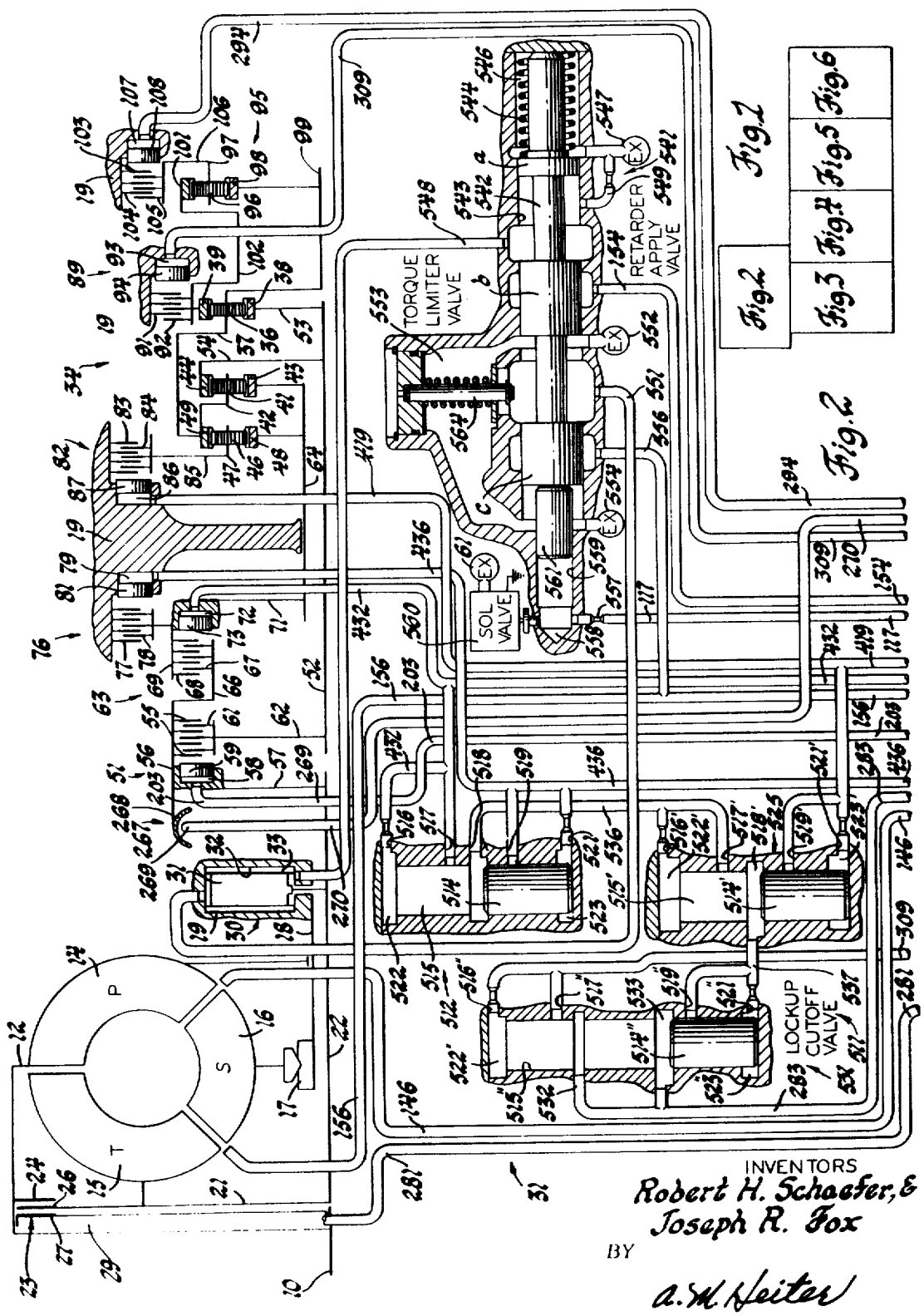

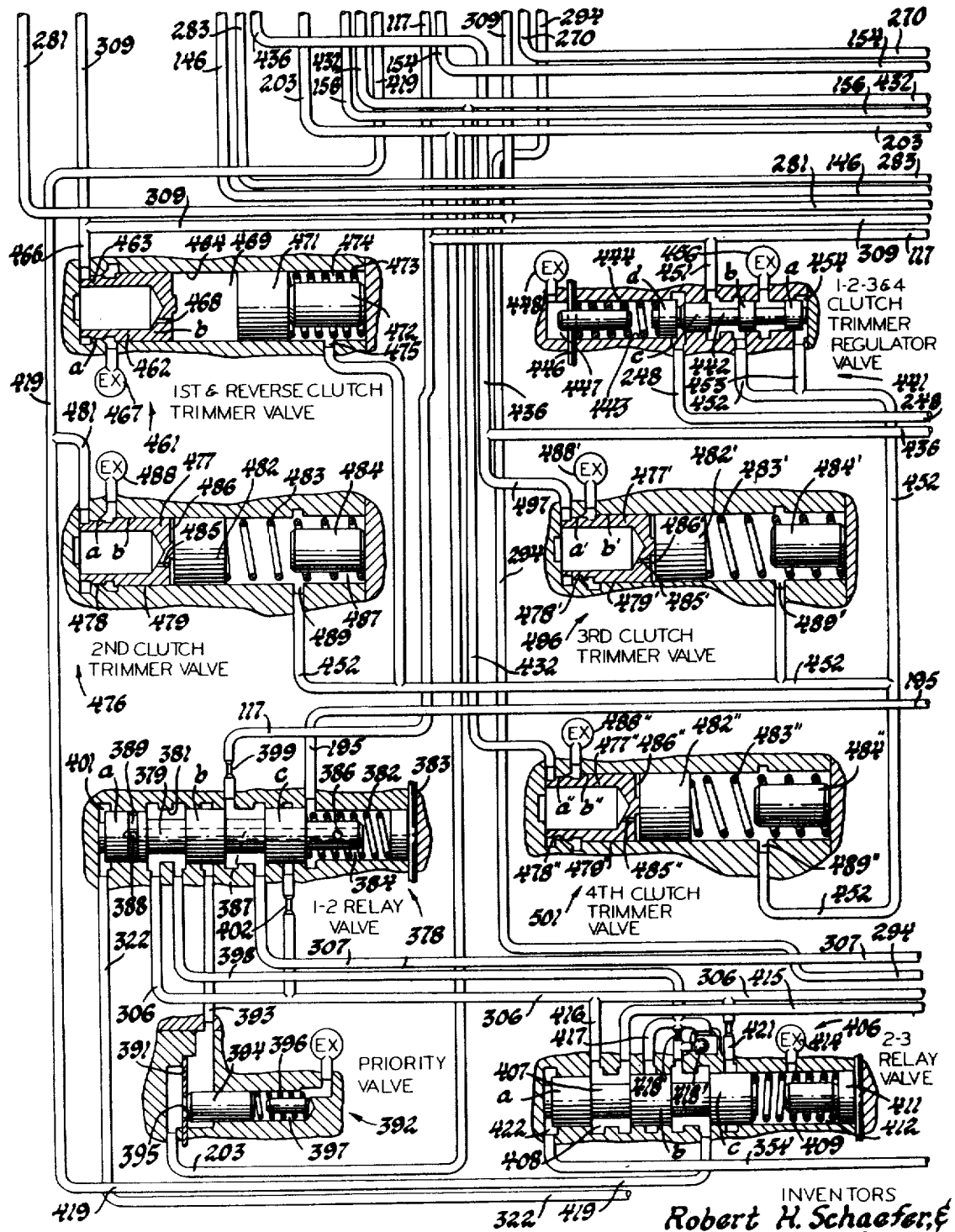

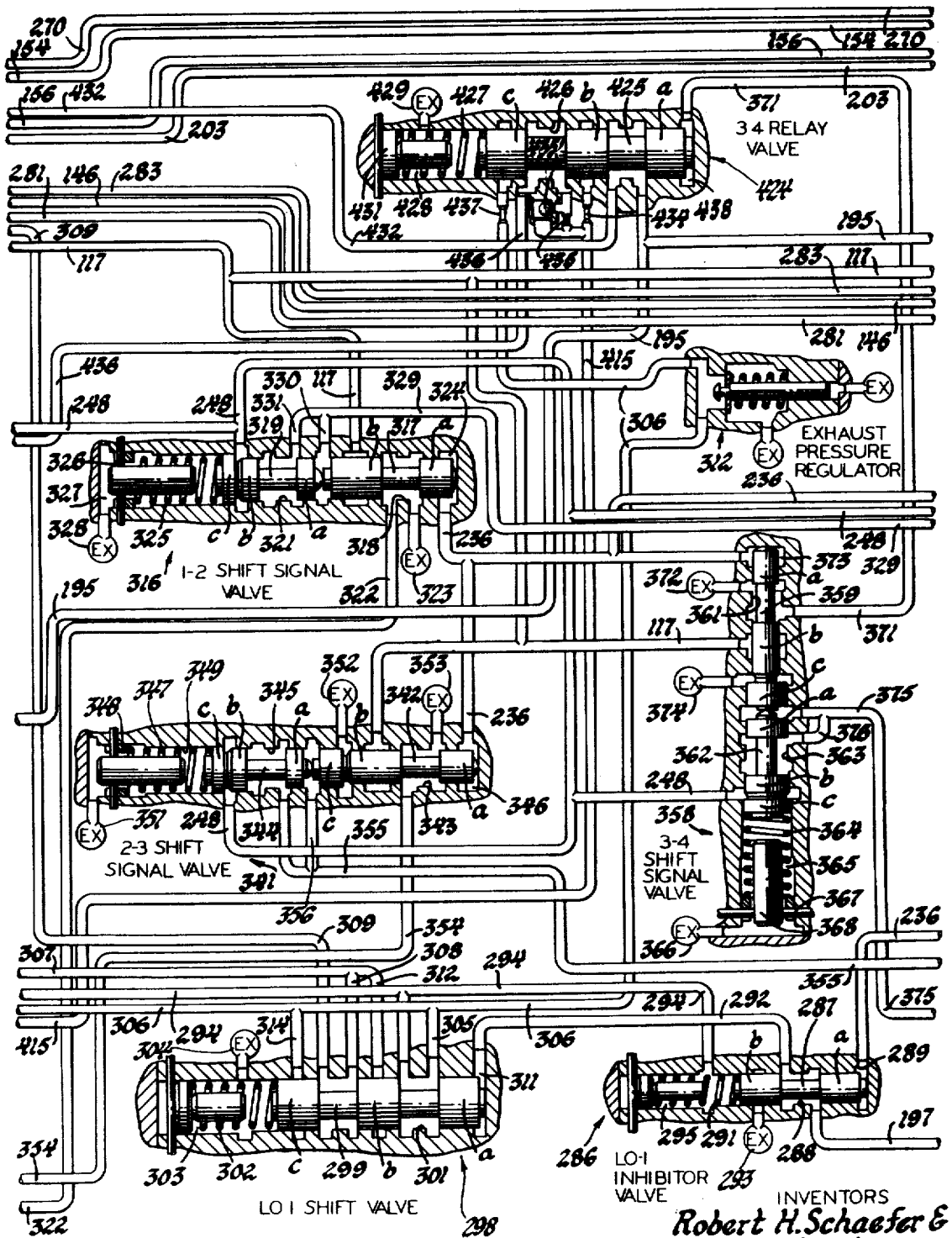

TRANSMISSION AND CONTROLS

This invention relates to an automatic transmission and controls therefor and is a continuation in part of Applicant's prior application Ser. No. 852,760 filed Aug. 25, 1969, not abandoned.

This invention is shown in a transmission having a torque converter lockup clutch and five speed gearing drive having a forward input clutch engaged in all forward drives and one individual speed drive engaging device sequentially operated for each of the five forward speeds. The second and highest individual speed drive engaging devices are engaged for reverse drive.

Since this five speed transmission having first to fifth speeds also provides a four speed transmission by using only the second to fifth speed gearing and controls, these speeds are called the first to fourth speeds and the first or lowest speed is called low speed in the detailed description of the preferred embodiment. The improved controls utilize a simple construction preventing simultaneous engagement of more than one forward speed drive and providing under proper conditions manual selection of low and reverse drive and several forward drive ranges providing one speed or groups of speeds under various modes of control. Thus there are various control sequences involving different groups of at least three speeds, a lower, an intermediate and a higher speed, for convenience referred to as a first, second and third speed. The control system has a manual selector valve actuable in a lowest or manual range to select and hold a first speed drive and four higher automatic ranges providing automatic control in four higher speed drives, second to fifth.

The highest automatic range provides automatic speed governor and torque demand shifting at normal vehicle speeds between second and fifth speeds and each consecutively lower automatic range, provides this type shifting between second and one lower speed when it is desired to normally hole the transmission in a lower speed drive. When in any lower automatic range, though normal automatic shifting to speed drives not included in the range is prevented, shifting to and from these speed drives is permitted at higher than normal vehicle speeds or hold speeds encountered on overrun. A throttle actuated detent control provides for automatic shifting at a speed, intermediate, normal shift speeds and the hold shift speeds. The automatic shift valves provide upshifting at an increasing speed with increasing throttle and downshifting at lower speeds increasing at a faster rate than the upshift speeds with increasing throttle between second and fifth speeds. The shift valve for each automatic shift change controls a relay valve which functions on an upshift to connect a pressure through the relay valve for the next higher speed which is then in the downshift position so that the ultimate control for each speed establishing device is controlled by the same valve element so only one can be established at a time and by its individual feed restriction to suit its feed requirements independent of the others. Each speed device has independent upshift and downshift exhaust restrictions independent of the others. The relay valve for the lowest speed in the automatic ranges, first speed, when upshifted feeds the next higher speed relay valve as pointed out above and only when downshifted feeds a governor inhibited manually controlled first and low speed relay valve controlled by the selector valve to provide a manual shift to low and reverse only at proper speeds.

The feed to the governor controlled lockup clutch valve is exhausted and interrupted for a timed period after initiation of pressure in any one line engaging one of the automatically controlled forward speed engaging devices for a shift by a series of cut-off shuttle valves so the lockup clutch is disengaged during each shift change.

An object of the invention is to provide in an automatic transmission having a series of increasing speed devices for establishing a series of speeds and an improved control providing a plurality of increasing drive speed signals in accordance with output speed and torque demand and operating a series of relay valves sequentially establishing the series of increasing speed devices and having a continuous feed to a first relay valve for the first speed drive in the series and a manual selector valve controlled feed for the higher speed drives in the series feed through the upshifted first relay valve and the downshifted second relay valve for second speed and through the upshifted first and second relay valves and the downshifted third relay valve for third.

Another object of the invention is to provide in an automatic transmission having a series of individual speed drive devices for establishing a series of increasing forward speed drives and a lower and a higher of said individual speed drive devices establishing reverse, an improved control providing a plurality of drive speed signals for a series of increasing speed drives in accordance with output speed and torque demand and operating a series of relay valves sequentially establishing the series of increasing speed drives and having a first feed to the first relay valve which when downshifted establishes a first speed drive device and a manual selector valve operative in an automatic range position to establish the forward drive device to then establish first speed and a second feed to the first relay valve which, when upshifted, feeds through the downshifted second relay valve to a second speed device for establishing second speed drive and the second relay valve when upshifted continuing the second feed through the downshifted third relay valve to a third speed device for establishing third speed drive and the upshifted third relay valve to a fourth speed for establishing fourth speed and the selector valve having a reverse drive position disestablishing the forward device and discontinuing the second feed and supplying the downshifted third relay valve to feed the fourth speed device and operative when the first relay valve is automatically downshifted to feed the first speed device for establishing reverse drive.

Another object of the invention is to provide in an automatic transmission having a series of individual speed drive devices for establishing a series of increasing speed drives, an improved control system having a series of relay valves including a first relay valve supplying the first or second speed drive device, a second relay valve supplying the first or third relay valve and the third relay valve supplying the third speed device or a fourth speed device, control means responsive to output speed and torque demand sequentially shifting said second and third relay valves, a continuous fluid source connected by said second relay valve, only when downshifted, to supply said first relay valve and a selector valve operative in an automatic shift range position providing a fluid supply connected by said second relay valve only when automatically upshifted to said third relay valve and operative in a low speed selecting position to disconnect said fluid supply and downshift said first relay valve.

Another object of the invention is to provide in an automatic transmission having actuator devices including a forward actuator device established in all forward speeds and a plurality of individual forward speed actuator devices selectively actuated for establishing forward speed drives and an improved control system having a manual control operative in a forward automatic position to effect transmission shifting through a governor responsive shift control which is operative in response to changes in speed to automatically control shifting between the automatically controlled speed drives and an additional speed position operative only when the automatic speed responsive shift control is in the lowest speed position to effect engagement of an additional speed drive.

Another object of the invention is to provide in an automatic transmission having a forward actuator device established in all forward speeds and a plurality of individual forward speed actuator devices selectively actuated for establishing the forward speed drives and a reverse drive being established by engagement of the lowest and highest individual forward speed actuating devices and an improved control system having a manual control operative in neutral to engage the lowest speed actuator device, operative in forward drive to engage the forward actuator device and condition a speed responsive shift control to disengage the lowest speed actuator device and to engage the next higher speed actuator device with increasing speed and operative in reverse position to disengage the forward fluid actuator device and engage the individual highest speed actuator device to provide reverse drive only when the speed responsive shift control is in the lowest speed position.

Another object of the invention is to provide in an automatic transmission having a forward actuator device established in all forward speeds and a plurality of individual forward speed actuator devices selectively actuated for establishing the forward speed drives and an improved control system having a manual control operative in a forward automatic position to effect transmission shifting through a governor responsive shift control which is operative in response to changes in speed to automatically control shifting between the second speed drive and higher speed drives and a first speed position operative only when the automatic speed responsive shift control is in the second speed position and the output speed of the transmission is below a predetermined value to effect engagement of the first speed drive.

Another object of the invention is to provide in a transmission having a series of individual speed drive devices for establishing a consecutive series of increasing forward speed drives, an improved control system having shift valving and flow passages having a flow controlling feed passage portion for each individual speed drive device for controlling the establishing rate of each speed drive device independently of the controlling feed and exhaust passage portion for establishing feed and exhaust rates for the other speed drive devices and independent upshift exhaust and downshift exhaust flow controlling feed passage portions for each speed drive device exhausted on an upshift and a downshift so the flow of establishing feed, upshift exhaust and downshift exhaust for each speed drive device are controllable independent of the other flows.

Another object of the invention is to provide in a transmission having a series of individual speed drive devices for establishing a series of increasing forward speed drives, an improved control system having a series of shift valves, the first shift valve connecting the source when downshifted to a first speed device and, when upshifted, to a second shift valve which, when downshifted, continues the connection to a second speed device and, when upshifted, to a third speed device and having a flow controlling feed passage portion for each individual speed drive device for controlling the establishing rate of each speed drive device independent of the establishing and exhaust rates for the other speed drive devices and independent exhaust flow controlling upshift exhaust and downshift exhaust passage portions for each speed drive device exhausted on an upshift and downshift so the flow of establishing feed, upshift exhaust and downshift exhaust for each speed drive device are controllable independent of the other flows.

Another object of the invention is to provide in a transmission having a series of individual speed drive devices for establishing a consecutive series of increasing speed drives, an improved control system having a first and a second shift valve each having first and second inlet ports, first and second outlet ports and first and second exhaust ports and the first shift valve being operative in a downshift position to connect its first inlet port having a first speed flow control portion to its first outlet port and first speed device and connect its second outlet port to its second exhaust port having a downshift flow control portion operative on a two-one shift and in an upshift position to connect its second inlet port to its second outlet port and its first outlet port to its first exhaust port having an upshift flow control portion operative on a one-two upshift, the second shift valve in a downshift position connecting its first inlet port having a second speed flow control portion to its first outlet port and the second speed device and connecting the third speed device by its second outlet port to its second exhaust port having a downshift flow control portion operative on a three-two shift and an upshift position connecting said second inlet port having a third speed flow control portion to said second outlet port and the third speed device and connecting said second speed device by its first outlet port to its first exhaust port having a flow control portion operative on a two-three shift, and the second speed control portion having a return bypass so its exhaust on a two-one shift is controlled by the flow control portion of the first shift valve's second exhaust port.

These and other objects of the invention will be apparent from the following description and drawing of the invention.

FIGS. 2, 3, 4, 5 and 6 when arranged according to FIG. 1 schematically shown the gearing and control of the transmission.

Referring to the drawing, FIG. 2 shows the power train having an input shaft 10 driving a rotary torque converter housing 12 which drives the pump 14. The pump hydrokinetically drives the turbine 15 and the fluid is redirected by the stator 16 to the pump 14. The stator is mounted on a one-way brake 17 secured to a sleeve 18 fixed to the housing 19. The turbine is connected by a hub 21 to the torque converter output shaft 22. A lockup clutch 23 for directly connecting the input shaft 10 to the converter output shaft 22 has a fixed backing plate 24 mounted on the rotary housing 12, a driven plate 26 connected through hub 21 to drive the output shaft 22 and a diaphragm piston and apply plate 27 which forms a closed expansible chamber 29 between the diaphragm piston 27 and the front wall of the rotary housing 12. A hydrodynamic brake 30 is provided by a plurality of vanes 31 mounted for rotation with shaft 22 and located in a chamber 32 having fixed vanes 33 formed in the transmission housing 19.

The four speed gear unit 34 has three planetary gear sets and is compounded with a low speed gear set 95 to provide 5 speeds which are hereinafter referred to as low and first to fourth. In the four speed unit 34, the rear or first gear set has planetary pinions 36 mounted on a carrier 37 and meshing with sun gear 38 and ring gear 39. The second gear set has pinions 41 rotatably mounted on carrier 42 and meshing with sun gear 43 and ring gear 44 and the third gear set has planetary pinions 46 mounted on the carrier 47 and meshing with sun gear 48 and ring gear 49.

The forward clutch 51 is engaged in all forward ratios and connects the converter output shaft 22 to drive the range gear unit input shaft 52 which drives, through hub 53, the sun gear 38 of the first gear set and through hub 54 the ring gear 44 of the second gear set. The forward clutch 51 has input plates 55 mounted on a drum 56 driven by the rotary hub 57 drive connected to shaft 22. The hub 57 has a cylinder 58 formed therein for piston 59. On the supply of fluid by drive four line 203 to the cylinder 58, the piston 59 engages the input plates 55 and the output plates 61 which are connected by a hub 62 to drive the gear unit input shaft 52. Fourth speed clutch 63 connects the converter output shaft 22 to the secondary input shaft 64 which drives the sun gears 43 and 48 of the second and third gear sets and with the above forward clutch drive locks the gearing for 1:1 drive from carrier 42, ring gear 49 and carrier 37 to the output shaft 99. The fourth speed clutch 63 has an input drum 66 formed as a continuation of drum 56 and is thus driven by shaft 22 and drives input plates 67. The output plates 68 are connected by drum 69 and hub 71 to secondary input shaft 64. The hub 71 has a cylinder 72 formed therein for the piston 73 and on the supply of fluid to the cylinder by fourth clutch apply line 432, piston 73 engages the plates to effect a drive from the converter output shaft 22 to the secondary input shaft to drive sun gears 43 and 48. The shaft 64 may also be held by the third speed brake 76 which has fixed plates 77 and rotary plates 78 drive connected through drum 69 and hub 71 to shaft 64 to hold shaft 64 and sun gears 43 and 48. When fluid is supplied by third apply line 436 to the cylinder 79 formed in housing 19 to move the cylinder 81 to engage plates 77 and 78, the brake 76 is engaged to hold the shaft 64 and the sun gears 43 and 48. The second speed brake 82 has a plurality of fixed plates 83 fixed to the housing 19 and rotary plates 84 connected by hub 85 to the carrier 47 of the third gear set. When fluid is supplied by second apply line 419 to the cylinder 86 formed in housing 19, piston 87 moves to engage the plates 83, 84 and holds the carrier 47. The first and reverse brake 89 has a plurality of fixed plates 91 secured to housing 19 and rotary plates 93 drive connected to ring gear 39. When fluid is supplied, by first speed brake apply line 309 to the cylinder 93 formed in housing 19 to move the piston 94 and engage plates 91,92, the ring gear 39 of the first gear set is held.

A low gear set 95 has a plurality of planetary pinions 96 mounted on a carrier 97 and meshing with a sun gear 98 which is drive connected to the output shaft 99 and with the ring gear 101 which is drive connected by a hub structure 102 to the ring gear 39 of the first gear set. The low brake 103 has a plurality of fixed plates 104 secured to the housing 19 and rotary plates 105 secured by drum and hub 106 to the carrier 97. Fluid is supplied by low brake apply line 294 to cylinder 107 in housing 19 to move piston 108 to engage plates 104 and 105 to establish low speed drive.

CONTROLS

The brakes and clutches are engaged as indicated by X on the following chart and the others disengaged to provide neutral, five forward speeds and reverse.

| Drives | | Brakes | | | Clutches | |
|---|---|---|---|---|---|---|
| | 103 | 89 | 82 | 76 | 63 | 51 |
| R | | X | | | X | |
| N | | X | | | | |
| Lo | X | | | | | X |
| 1 | | X | | | | X |
| 2 | | | X | | | X |
| 3 | | | | X | | X |
| 4 | | | | | X | X |

FLUID SUPPLY

Figure 6:
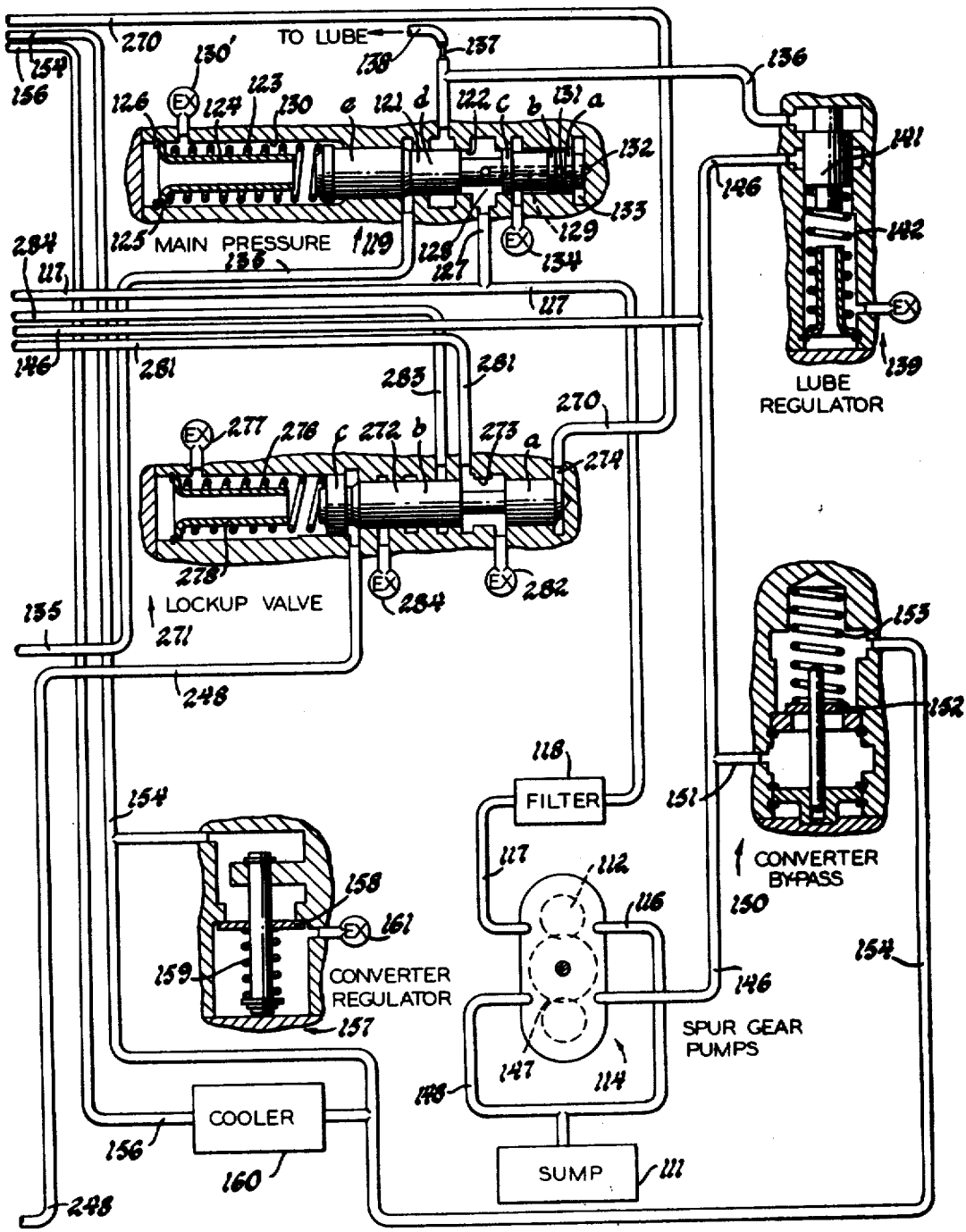

Referring to FIG. 6, the fluid exhausted from the control and lubrication system collects in the sump 111 in the lower portion of the transmission housing. One pump 112 of a three elements gear pump 114 draws fluid through the suction line 116 and delivers fluid to the main line 117 which passes through the filter 118 and is regulated by the main pressure regulator valve 119. The main pressure regulator valve 119 has a valve element 121 having lands a, b, c, d, of equal diameter and a larger land e located in a stepped bore 122. The valve element 121 is biased to the closed position shown by a spring 123 mounted on a combined spring seat and stop element 124 which has a flared end 125 providing a seat for the spring and abutting snap ring 126 to retain the seat element and spring in spring chamber 130 vented by exhaust 130'. The main line 117 has a branch 127 connected between the lands c and d and through port 128 and the bore 129 through the valve to the port 131 between the lands a and b and the port 132 at the end of the valve elements to provide hydraulic bias in chamber 133 opposing the spring to regulate the main line pressure at a predetermined value. Regulated pressure is supplied by port 132 to the space between the lands *a* and *b* to prevent leakage from chamber 133 to the space between lands *b* and *c* vented by exhaust 134 to provide a positive seal between the main line pressure at port 128 and chamber 133 for improved regulation. The forward knockdown pressure line 135 is connected at the step between lands *d* and *e* to reduce the regulated pressure to i.e. 180 psi in all forward drive positions while pressure in reverse drive is higher, i.e. 300 psi. Excess main line pressure in line 117 and chamber 133 moves the regulator valve element 121 to the exhaust position exhausting branch 127 to overage line 136 which feeds through restriction 137 to the lubrication line 138 which lubricates the gearing. Overage line 136 is also connected to the lubrication relief regulator valve 139 which has a valve element 141 biased to a closed position by a spring 142 and is closed when the overage pressure does not exceed a low value to first supply lubrication line 138. When the lubrication pressure is sufficient, overage pressure exceeds this intermediate value, i.e. 80 psi, and the valve 139 opens to connect overage line 136 to the converter feed line 146 to supply fluid to the torque converter. The other pump 147 of the pump unit 114 draws fluid via suction line 148 and delivers fluid to the converter feed line 146 to provide the main feed to the torque converter. When this torque converter feed pressure exceeds a predetermined low pressure, i.e. 62.5 psi, excess fluid flows via branch 151 of converter feed line 146 moving valve element 152 against the bias spring 153 of converter bypass valve 150 to exhaust converter feed pressure to the cooler outlet line 154. The converter outlet line 156 is connected in FIG. 6 through the cooler 160 to the cooler outlet line 154 where the pressure is limited by the converter pressure regulator valve 157 which has a valve element 158 normally biased by spring 159 to block passage to exhaust 161 but which, at a predetermined low pressure i.e. 25 psi opens to exhaust 161 to limit the pressure in cooler outlet line 154.

DETENT VALVE

A through detent valve 162, FIG. 5, which has a valve element 163 having equal diameter lands *a*, *b* and *c* located in a bore 164 and is biased in an opening direction by a spring 166 located in the spring chamber 167 vented by exhaust 168. Main line pressure 117 is connected through restricted passage 169 to a chamber 171 to act on the inactivating piston 172 to normally engage valve element 163 and hold it in the extreme right position against the stop element 173 so that the through detent valve does not deliver pressure to the detent line 174. When the throttle pedal 176 is at the full throttle position, it closes switch 177 connecting a grounded power source 178 to the solenoid valve 179 which opens the port 180 to exhaust 181 to vent fluid in chamber 171 to permit the detent valve 162 to regulate pressure. The regulated pressure supplied from main line 117 via branch 182 to the space between lands *a* and *b* to the branch 183 of detent line 174 and through restricted branch 184 to the space between the piston 172 and valve element 163 to initiate regulation of detent line pressure at a predetermined low value, i.e. 38 psi, determined by spring 166. Excess pressure will move the valve element 163 against the spring 166 and connect the detent line to exhaust 186.

SELECTOR VALVE

The manual selector valve 191 has a valve element 192 having equal diameter lands *a*, *b* and *c*. In all valve positions, main line 117 is connected to the signal feed line 194. In neutral the main line is also connected to the forward knockdown line 135. The reverse selector line 195 is connected to exhaust 196. The low drive line 197, the drive one line 198, drive two line 199 and the drive three line 201 are connected to exhaust 202. The drive four line 203 is connected via hold feed line 204, hold regulator valve 209, hold pressure line 217, drive three line 201 to exhaust 202.

On movement of the selector valve 192 to the reverse position, land *c* closes exhaust 196 and opens port 206 to connect main line by fast feed ball check valve 207 and slow return restriction 208 to the reverse selector line 195. The forward knockdown line 135 is also exhausted via hold feed line 204. On movement of the selector valve to drive four position, DR4, reverse is exhausted and in addition to feeding feed line 194 and forward knockdown line 135 as in neutral, the drive four line 203 is fed while the other drive lines remain connected to exhaust as in neutral. In drive three position, DR3, the main line 117 additionally feeds the hold feed line 204 and blocks the exhaust of drive three feed line 201. In drive two position, DR2, the main line feeds the same lines and interconnects drive two feed line 199 and drive three feed line 201. In drive one position, DR1, the main line feeds the same lines and the drive one feed line 198, drive two feed line 199 and drive three feed line 201 are interconnected. In low the drive one, two, and three feed lines, 198, 199 and 201, and the low drive feed line 197 are all interconnected.

HOLD REGULATOR VALVE

The hold regulator valve 209 regulates the pressure distributed by the drive low, one, two, and three feed lines and has a valve element 211 having equal lands *a*, *b* and *c* located in a bore 212. A spring 213 located in a spring chamber vented by exhaust 214 biased the valve 211 to the open position shown. In the open position shown, the hold feed line 204 is connected through restriction 216 to the space between lands *b* and *c* and supplies hold pressure supply line 217 which is connected to the drive three line 201. This hold pressure supply line 217 is also connected by restricted passage 218 to the closed chamber 219 at the end of bore 212 to act on land *a* of the valve element to oppose the spring bias. The pressure in chamber 219 moves the valve against the spring to connect line 217 to exhaust 221 or feed line 204 to regulate hold pressure at a valve intermediate main line pressure and detent pressure, i.e. 45 psi.

REAR GOVERNOR

The governor valve 223 has a valve element 224 having equal lands *a*, *b* and *c* mounted in a bore 225 and is rotatably driven by a gear 226 driven from output shaft 99 by a spline connector 227 which permits axial movement of the valve element 224 under the influence of the rotating governor weights 229 and secondary weights 231 which provide a stepped pressure varying with output or vehicle speed. Fluid pressure supplied by the signal feed line 194 through filter 233 is connected between lands *a* and *b* and by a passage 234 through the valve element to the end valve element 224 to act on the end of the valve element to move it to an exhausting position connecting governor signal line 236 to exhaust 237 against the opposing force of the governor weights. The force of the governor weights overcomes the pressure to move the valve to the left connecting signal feed line 194 to governor line 236 and closing exhaust 237. The one way check valve 238 permits fast flow of the governor signal pressure to the shift valves and the return restriction 239 only permits slow return flow so the governor pressure line has fluid flow to supply without pressure drop, the expanding governor pressure chambers when shift valves upshift and reduce return flow to prevent sharp reduction of governor pressure due to drive line shock.

MODULATOR PRESSURE REGULATOR

The modulator pressure regulator 241, FIG. 5, provides a pressure inversely proportional to torque demand and has a valve element 242 having equal lands $a$ and $b$ mounted in a bore 243. The spring 244 located in a spring chamber 245 vented by exhaust 246 biases the valve element to the open position connecting signal feed line 194 between the lands to the modulated signal line 248 which is connected by a restrictive passage 249 to the chamber 250 at the end of the bore 243 to act on the end of land $b$ to bias the valve element to connect modulator line 248 between lands $a$ and $b$ to exhaust 251, to regulate the modulated signal pressure inversely proportional to torque demand on the engine or the force delivered by vacuum actuator 253.

The modulator pressure regulator valve 241 is controlled by a vacuum actuator 253 consisting of a container 254 fixed to the valve body and having a flexible diaphragm 255 therein dividing the container into a vacuum chamber 256 connected by the pipe 257 to the engine manifold vacuum and having an atmospheric chamber 258 connected to atmosphere by the apertures 259. The diaphragm 255 is biased by a spring 260 in the vacuum chamber and is secured to an actuator stem 261 which is reciprocally mounted in and passes through a bore or aperture in the container 254 and into a bore 262 in the end wall of the valve body. Chamber 263 in bore 262 is vented by exhaust 264. The stem engages a pin 265 reciprocably mounted in a bore 266 in the valve body to engage the valve element. The force of the actuator spring 260 is inversely proportional to the vacuum and thus increases with increasing throttle opening or torque demand and acts through the stem 261 and pin 265 on the valve element 242 and with the regulated pressure in opposition to the valve spring 244 to provide a regulated pressure proportional to vacuum and inversely proportional to actuator force, torque demand or throttle opening.

FRONT GOVERNOR

A front governor 267, FIG. 2, provides a pressure signal proportional to the speed of the torque converter output shaft 22 and has a can or annular trough 268 rotatably mounted on the hub 57 and thus rotatable with shaft 22. Fluid from the lubrication system fills the can and this rotating body of fluid impinges on the opened end of the pitot tube 269 to provide a pressure in the front governor line 270 proportional to converter output speed for the lockup shift valve 271, FIG. 6.

LOCKUP VALVE

The lockup shift valve 271, FIG. 6, has a valve element 272 having lands $a$, $b$, $c$ reciprocably mounted in a stepped bore 273. The front governor pressure line 270 is connected to closed chamber 274 to act on the end of land $a$ to bias the valve against the bias of spring 276 located in a chamber vented by exhaust 277 and having a stop and spring seat member 278. Inverted modulator pressure in line 248 acts between the lands $b$ and $c$ and on the unbalanced area of the larger land $c$ with governor pressure to overcome the spring bias and upshift the shift valve. With the lockup valve in a downshift position shown, lockup apply line 281 is connected to exhaust 282 to disengage the lockup clutch 23. The valve is upshifted by governor and inverted modulator pressure forces acting in an upshifted direction and overcoming the bias of the spring in a downshift direction. From the functional viewpoint, the lockup valve provides the shifts at higher output speeds with high throttle setting and shifts at lower output speeds at lower throttle settings. When the lockup cut-off valves 511 provide, as explained below, a lockup feed pressure in lockup feed line 283, this pressure is connected between the lands $a$ and $b$ of the upshifted lockup valve to lockup clutch apply line 281 to engage the lockup clutch. The land $b$ is slightly larger than land $a$ so the main line pressure connected to the lockup clutch provides a hysteresis force, so downshifts are at higher speeds at each torque demand value. The exhaust 282 then being closed. The exhausts 282 and 284 permit leakage fluid to escape to prevent main line leakage affecting governor or modulator pressure.

LOW ONE INHIBITOR VALVE

The low one inhibitor valve 286, FIG. 4, prevents the downshift to low speed drive at speeds above a predetermined speed for smooth shifting. The inhibitor valve has a valve element 287 having equal diameter lands $a$ and $b$ slidably mounted in a bore 288 and biased by rear governor pressure from line 236 connected to chamber 289 at the end of the bore to act on the land $a$ and move the valve element against the bias of spring 291 to block the low drive hold line 197 and connect the low one shift signal line 292 to exhaust 293 to prevent engagement of low drive. Below this predetermined speed the low one inhibitor valve is in the connecting position shown, connecting hold regulated pressure which is in the low drive line 197 when the selector valve is in low position, to the low one shift signal line 292 which actuates the low one relay shift valve 298. Whenever the low brake is applied the pressure in the low apply line 294 is connected to the closed spring chamber 295 to hold the inhibitor valve in the position shown connecting low drive line 197 to low one shift signal line 292 regardless of governor pressure and speed.

LOW ONE SHIFT VALVE

The low one shift valve 298, FIG. 4, has a valve element 299 having equal diameter lands $a$, $b$ and $c$ mounted in a bore 301 and biased to the first drive speed position by the spring 302 mounted in a spring chamber 303 vented by exhaust 304. With the valve element in the first speed drive position shown, the low apply line 294 is connected to branch 305 of exhaust line 306 and main line pressure is supplied from the one-two shift relay valve 378 via low one shift line 307 and its branch 308 between the lands *b* and *c* to the first speed apply line 309 which is connected to the first brake cylinder 93 to establish first speed drive. When fluid is supplied by the low one inhibitor valve 286 to the low one shift signal line 292 to the chamber 311 at the end of valve element 299 acting on land *a*, the valve is moved against the spring bias to the low drive position connecting the branch 312 of the low one shift line 307 to the low apply line 294 to cylinder 107 to establish low speed drive and the first apply line is connected to branch 314 of exhaust line 306.

ONE-TWO SHIFT SIGNAL VALVE

Automatic shifting between first to fourth speed forward drives is provided by speed and torque demand signal controlled shift signal valves, one for each speed change, each having an associated relay valve. The shift and relay valves for each speed change are similar but are individually described with the connections and then the operation is discussed.

The one-two shift signal valve 316, FIG. 4, has a valve element 317 having land *a* and larger land *b* in a stepped bore 318 and a control element 319 having lands *a*, *b* and *c* of increasing diameter from *a* to *c* mounted in a stepped bore 321. The land *b* of valve element 317 is larger than land *a* so that when the valve is moved from the downshift position shown in FIG. 4 to the upshift position connecting main line 117 to the one-two signal line 322 for a shift to second speed, there is an added hysteresis force in an upshift direction on the valve. In the downshift position shown, the one-to signal line 322 is connected to exhaust 323 and this hysteresis force is dropped. In both downshift and upshift positions, gear governor pressure from line 236 enters chamber 324 at the end of bore 318 and acts on land *a* of valve element 317 in an upshift direction. Also modulator pressure line 248 is connected to the stepped bore between the large land *c* and the smaller land *b* of control element 319 to also provide an upshift direction force. Both the governor and modulator upshift direction forces are opposed by the downshift direction force of spring 325 which is mounted on a suitable spring seat and stop assembly 326 in a spring chamber 327 vented by exhaust 328. When governor pressure and modulator forces overcome the spring force, both valve elements upshift and the modulator pressure from line 248 is also connected between land *a* and *b* of the control valve element 319. Since land *b* is larger than the land *a* there is an additional area and upshift force after upshifting to control the downshift. The two-one downshift line 329 may supply either hold pressure from the drive one line 198 or detent pressure from detent line 174 and is connected via branch 330 to hold the shift valve element 317 in the downshift position when downshifted or via branch 331 when the valve element is upshifted to downshift the shift valve element at a predetermined speed. The regulated hold pressure supplied is insufficient to downshift above a predetermined speed for a proper shift.

The two one downshift line 329 is supplied in a detent position of the throttle pedal by detent valve 162 and detent line 174. If the slightly higher hold pressure from hold regulator valve 209 is connected by the selector valve 191 in the drive one position to drive one line 198, the one two shuttle valve 332 blocks detent line 174 and connects hold pressure from drive one line 198 to downshift line 329. The shuttle valve 332 has a ball 333 located in a chamber 334 having a bottom surface having depressed seat port 335 at the entry of detent line 174 to the chamber and closely adjacent depressed seat port 336 at the entry of drive one line 198. The downshift line 329 is connected to chamber 334 by a port that is wide and positioned so it cannot be blocked by ball 333. When pressure is supplied to one of seat ports 335 or 336, the ball will seat in and close the other. The chamber has a rounded upper surface particularly at the ends to guide the ball into the seat ports and the height of the chamber between the seat ports should be only slightly greater than the ball diameter.

TWO-THREE SHIFT SIGNAL VALVE

The two-three shift signal valve 341 has a valve element 342 having lands *a*, *b* and *c* of increasing diameter from *a* to *c* in a stepped bore 343 and a control element 334 having lands *a*, *b* and *c* of increasing diameter from *a* to *c* in a stepped bore 345. In both the up and down shift positions of the shift valve, the governor pressure line 236 is connected to the chamber 346 to provide an upshift direction force and the modulator pressure line 248 is connected between the lands *b* and *c* of control element 344 to act on the excess area of land *c* to provide an upshift force against the downshift direction force of spring 347 mounted on a seat assembly 348 in the spring chamber 349 which is vented by exhaust 351. Exhaust 352 vents a space between lands *b* and *c* of valve element 342. Exhaust 353 exhausts the two-three signal line 354 with the valve element 342 in the downshift position shown so there is no two-three signal pressure for a shift to third. On an upshift exhaust 353 is closed and main line 117 is connected to the two-three signal line 354. With the shift valve 342 and control valve 344 in the downshift position shown or upshift position, governor pressure from line 236 in chamber 346 acting on land *a* and modulator pressure from line 248 acting on land *c* of control valve 342 provides an upshift direction force against the downshift force of spring 347 to provide upshifts. When the governor pressure and modulator pressure overcome the spring force, the shift valve 342 and control valve 344 move to the upshift position. Then main line pressure acting on land *b* which is larger than land *a* provides an upshift hysteresis force and modulator pressure acting on land *b* provides an added upshift force to provide downshifts at speeds lower than upshift speeds. The three two downshift line 355 in the downshift position of the shift valve and the branch 356 in upshift position of the shift valve is connected to the valve bore between the shift valve element 342 and the control valve element 344, for downshifting the shift valve element when supplied with hold or detent pressure. The detent pressure line 174 and the hold pressure via drive two line 199 are connected to the two three shift shuttle valve 357 which has the same structure as the one two shuttle valve 332 and thus has the same reference numbers primed. When the throttle pedal is in detent position providing detent pressure in line 174 shuttle valve 357 connects this pressure to the three-two downshift line 355 but if the selector valve 191 is in drive two or lower positions providing hold pressure in line 199 this pressure is supplied to downshift line 355 and detent pressure blocked.

THE THREE-FOUR SHIFT SIGNAL VALVE

The three-four shift signal valve 358, FIG. 4 has a shift valve element 359 having lands a, b and c located in a stepped bore 361 and a control valve element 362 having lands a, b and c in a stepped bore 363. The lands of both valve elements have sequentially increasing diameters from a to c. Both valve elements are biased to the downshift position by a spring 364 located in a spring chamber 365 vented by exhaust 366. The spring is seated on an adjustable seat 367 and having a stop pin 368 limiting valve movement. In the downshift position, shift valve element 359 blocks main line 117 and connects the three-four shift signal line 371 to exhaust 372. In this position, governor pressure acting in chamber 373 on the land a of valve element 359 and modulator pressure line 248 acting on the land c of control valve element 362 provide a force in the upshift direction against the downshift direction force of the spring 364. When governor and modulator pressure overcome the spring force, the valve elements upshift. In upshift position land a of valve element 359 blocks exhaust 372, main line 117 is connected to the three four shift signal line 371 and the main line pressure between lands a and b acts on the larger area of land b to provide a primary additional upshift hysteresis force. In addition, modulator pressure also acts on land b of control valve element 362 to provide an additional upshift force causing downshifts at lower speeds. The exhaust 374 vents the valve bore between the downshift line 375 and main line 117. Hold or detent pressure in the three-four downshift line 375 and its branch 376 is connected between the valve elements when in the downshift and upshift position respectively to position valve element 359 in a downshift position at proper speeds. When detent pressure is supplied to line 174 the three-four shuttle valve 377 connects it to four-three downshift line 375 unless the selector valve is in drive low, one, two or three positions and supplies the higher hold pressure to drive three line 201 which is then connected to downshift line 375 and detent pressure is blocked. This shuttle valve 377 has the same structure and operation as shuttle valve 332 so the parts have the same reference numerals double primed.

ONE-TWO RELAY VALVE

The one-two relay valve 378, FIG. 3, has a valve element 379 having equal diameter lands a, b and c located in a bore 381 and is biased to the first speed position shown by a spring 382 seated on the spring seat 383 located in a closed chamber 384. The chamber 384 is connected by a port 386 and a passage 387 through the valve element to a port 388 located in a groove 389 in the land a to exhaust the chamber in the upshift position. Main line pressure supplied from the selector valve 191 to the drive four line 203 is always connected through restriction 391 in the priority valve 392 to the priority main line 393. The priority valve has arranged in parallel with restriction 391 a relief valve having a valve element 394, closing port 395 under the bias of spring 396 in vented chamber 397 when the pressure in main line and drive four line 203 is insufficient for properly operating the transmission and open when the pressure is sufficient. The valve will close momentarily during shifts involving engagement of second, third and fourth in forward drives to maintain sufficient main line feed pressure to the modulator valve 253 and governor valve 223. The restriction 391 provides an exhaust connection in neutral position of the selector valve.

Relay valve 378 in the first speed position shown, connects the one two shift line 398 to exhaust line 306, blocks priority drive four line 393, connects the main line 117 via restriction 399 between the lands b and c to the low first shift line 307, blocks restricted branch 402 of exhaust line 306 at the land c and connects reverse drive line 195 from the manual selector valve adjacent land c to the spring chamber 384 which is closed since passage 387 is blocked. When the one-two shift signal valve 321 provides pressure in the one-two signal line 322 to supply fluid to the closed chamber 401, valve element 379 is moved against the bias of the spring except in reverse to the second speed position. Then spring chamber 384 is connected via passage 387 to exhaust line 306, priority drive four line is connected to the one-two shift line 398, main line 117 is blocked by land b, the low first shift line 307 is connected via restricted branch 402 to exhaust line 306 and reverse line 195 is blocked by land c.

TWO-THREE RELAY VALVE

The two-three relay valve 406 has a valve element 407 having equal diameter lands a, b and c located in a bore 408 and biased by a spring 409 to the downshift or second speed position shown in FIG. 3. The spring is seated on a seat and pin assembly 411 in a chamber 412 vented by exhaust 414. When the relay valve is biased by the spring to the second speed position, the two-three shift feed line 415 is connected between lands a and b via branch 416 to exhaust line 306, one-two shift line 398 has unrestricted branch 417 blocked by land b and the restricted branch 418 and exhaust flow only check valve branch 418' connected between lands b and c to the second brake line 419 and restrictive branch 421 of the exhaust line 306 is blocked by land c. The check valve branch blocks flow from line 398 to the valve bore since the ball can seat in the outlet port to the valve bore 408 and permits free unrestricted flow from the valve bore 408 to line 398 since the outlet port for flow from the valve bore 408 is so close to a side wall that the ball cannot seat in this port. Both restricted branch 418 and unrestricted or less restricted check valve or check valve branch 418' are connected to the same port in bore 408. The check valve branch 418' provides only an exhaust passage while restricted passage 418 is a feed only passage. When the two-three shift signal valve 341 supplies the two-three shift signal line 354 pressure to chamber 422, the two-three relay valve element moves against the spring to the stop pin and exhaust branch 416 is blocked by land a. The one-two shift signal line 398 via branch 417 is connected to the two-three shift line 415, the restricted branch 418 and check valve branch 418' are blocked by land b and the second brake line 419 is connected via restricted branch 421 to exhaust line 306.

THREE-FOUR RELAY VALVE

The three-four relay valve 424 has a valve element 425 having equal diameter lands a, b and c located in a bore 426 and is biased by a spring 427 to the third position shown in FIG. 4. The spring is located in the chamber 428 vented by exhaust 429 and seated on a seat and valve stop assembly 431. When the valve element 425 is biased to the third position shown by the spring, reverse drive line 195 is connected between the lands a and b to the fourth clutch lines 432, the two-three shift signal line 415 has restricted branch 434 blocked by the land b and restricted branch 435 and exhaust flow only check valve branch 435' connected between lands b and c to the third brake line 436 and the exhaust line 306 connected by restriction 437 is blocked by land c. Check valve branch 435' is constructed and functions like check valve branch 418'. When the three-four shift signal valve 358 provides a signal pressure in the three-four shift signal line 371 to the chamber 438, this pressure acts on land a moving the valve to the fourth speed position. Then reverse drive line 195 is blocked by land a, to-three shift line 415 is connected by restrictive branch 434 to the fourth clutch line 432 and branch 435 and check valve branch 435' are blocked by land b and the third brake line 436 is connected via restriction 437 to exhaust line 306.

TRIMMER REGULATOR VALVE

The trimmer regulator valve 441, FIG. 3, has a valve element 442 having equal diameter lands a, b, c and larger land d located in a stepped bore 443 and is biased to the feed position shown by a spring 444 seated on an abutment and stop pin assembly 446 located in a spring chamber 447 vented by exhaust 448. With the valve element 442 in the feed position shown, main line 117 branch 451 is connected between the lands b and c to the trimmer regulated pressure line 452 which is connected by branch 453 which may be restricted to the closed chamber 454 to act on the end of land a and oppose the spring bias and regulate the pressure. When the trimmer regulated pressure exceeds the regulated value, it will move the valve element 442 to the left connecting trimmer regulator pressure line 452 between lands a and b to exhaust 456. The modulator pressure line 248 is connected between the lands c and d to act on the unbalanced area of land d opposing the spring. Increasing modulator pressure provides a proportionately reduced trimmer regulator pressure. Since modulator pressure varies inversely with torque demand and is a maximum at idle and reduces to zero at a high throttle position, the trimmer regulator pressure is low at idle or at low torque demand values and increases proportionately to increasing torque demand to a high torque demand where the highest trimmer regulator pressure is determined by the spring force and the area of land a of trimmer regulator valve element 442.

TRIMMER VALVES

The first and reverse drive trimmer valve 461 has a trimmer regulator element 462 having a small land a and large land b located respectively in small bore 463 and large bore 464. The first brake apply line 309 is connected by branch 466 to the end of the bore 463 and acts on land a to bias the valve to the right to the open position connecting first brake apply line 309 to exhaust 467 to reduce the pressure. First brake apply pressure from line 309 is continuously connected through restriction 468 to the space 469 between the regulating valve element 462 and an actuator plug 471 which is shown seated on a stop member 472 fully compressing the spring 473 located in a closed chamber 474 having trimmer regulator pressure connected thereto at a port 475 below the stop and thus never blocked by plug 471. When line 309 is vented, spring 473 is extended with plug 471 engaging regulator valve element 462. On the initial supply of fluid to the first brake by first brake apply line 309, pressure acts on regulator valve element 462 and is regulated at a low pressure value determined by the trimmer regulator pressure which increases with increasing torque demand and the minimum spring force at full height in the valve assembly. At the same time fluid slowly flows through restriction 468 to fill and enlarge the space 469 to gradually separate the regulator valve element and plug so that the spring 474 is more and more compressed to gradually increase the regulated pressure at a rate determined by the restriction and spring rate until the maximum regulated pressure is provided with the valve elements in the position shown for gradual engagement of the friction devices. Then the pressure quickly increases to main line pressure. The valve will remain in this position until the first brake apply line 309 is exhausted and the valve will return to the initial position. The use of trimmer regulator pressure makes it possible to individually set the low pressure and rate of pressure rise to meet the requirements of each friction device with the same valve structure and springs fitting therein.

The second speed trimmer valve 476 similarly has a regulator valve element 477 having small land a and large land b respectively located in small bore 478 and large bore 479. Second brake pressure in line 419 is connected by branch 481 to the end of bore 478 and acts on the land a to move the regulator valve 477 and the plug 482 against bias of spring 483 and trimmer regulator pressure from line 452 and port 489 in chamber 487 to connect line 481 to exhaust 488 to reduce the pressure. The stop element 484 limits movement of the plug 482 and compression of the spring 483. When pressure is supplied via line 481 to the bore, it also flows through restriction 485 to the space 486 between the regulator valve and plug to enlarge this space to increase the spring force to gradually increase the pressure like first and reverse drive trimmer valve 461.

The third speed trimmer valve 496 has the same construction and function. Primed numbers from the second speed have been used to indicate like parts. This valve controls the third brake apply line 436 pressure which is connected by branch 497 and acts on the land a' of regulator valve element 477' which moves to open exhaust 488'. The trimmer regulator pressure line 452 is connected to port 488'. The fourth clutch trimmer valve 501 is similar to the above trimmer valves and functions in the same way and thus the same reference numerals with double primes have been used. The fourth clutch trimmer valve 501 regulates the fourth clutch pressure in line 432 and exhausts the excess to exhaust 488" and is controlled by trimmer regulator pressure from line 452 connected to port 489".

CUT-OFF VALVES

The lockup cut-off valves 511 provide a feed to the lockup clutch feed line 283 whenever fluid is supplied to any friction device, i.e., clutch or brake, apply line. A first cut-off valve 512 has a valve element 514 located in a bore 515 having closed ends and a restricted inlet port 516 at one end, an intermediate free flow inlet port 517, a central outlet port 518, an intermediate unrestricted inlet port 519 on the other side of the central outlet port and another restricted inlet port 521 at the opposite closed end of the bore. The restricted inlet port 516 is connected to an expansible chamber 522 formed by the one closed end of the bore and the valve element while near the one end and the restricted inlet port 521 is connected to an expansible chamber 523 formed by the other closed end of the bore and the valve element while near the other end. A second cut-off valve 525 and third cut-off valve 531 have a similar construction and the parts are indicated by primed numbers, except that in the first and second lockup cut-off valves 512 and 525, a single central port 518 is used, while in the third lockup valve 531 the bore is longer and has spaced dual central ports 532 and 533. The first cut-off valve 512 has the fourth clutch apply line 432 connected to inlets 516 and 517 and the third brake apply line 436 connected to inlets 519 and 521. In forward drives, pressure is supplied only to one of the first, second, third, and fourth apply lines respectively, 309, 419, 436 and 432, and the others exhausted. Thus, when one apply line has been under pressure for the time delay period or was the last line to be pressurized, i.e. third apply line 436, the valve element 514 is at the other end, i.e. at chamber 522, and blocks the other inlet port, i.e. inlet port 517, connected to fourth apply line 432 and connects the one pressurized apply line to the central outlet port, i.e. connects third apply line 436 by both inlet ports 519 and 521 to central outlet port 518. The cut-off valves are located horizontally so they will normally stay in the position in which they are set by fluid pressure. Then on a shift to another speed drive, i.e. to fourth, the one apply line, i.e. third apply line 436, is exhausted, decreasing the pressure while pressure is supplied to the other apply line, i.e. to fourth apply line 432, increasing the pressure. When the increasing fourth apply pressure in chamber 522 is greater then the exhausted third apply pressure in chamber 523, the lockup feed line is exhausted via outlet port 518 to exhausted third apply line 436 to disengage the lockup clutch and the fourth apply pressure feed through restricted inlet 516 slowly moves valve element 514 toward the other end and first blocks outlet port 518 after the lockup clutch is disengaged at the initiation of the shift and then valve element 514 moves further to open inlet port 517 whereupon full fourth apply pressure flow quickly moves valve element 514 to connect this pressure to outlet port 518 to re-engage the lockup clutch a predetermined time delay period after disengagement. Thus, first cut-off valve 512 supplies either pressure after a time delay period if the other pressure was last previously supplied or without time delay if the same pressure was last previously supplied. The outlet port 518 is connected by transfer line 536 to the ports 516' and 517' of the second cut-off valve 525. The second brake apply line 419 is connected to the ports 519' and 521' of the second clutch cut-off valve 425 which functions like cut-off valve 512 and thus supplies either third or fourth apply pressure connected to one group of inlet ports or second apply pressure supplied to the central port 518' whenever fluid is supplied by transfer line 536 or second apply line 419. The supply through cut-off valve 525 will be delayed or immediate as in cut-off valve 512.

Central port 518' of second cut-off valve 525 is connected by transfer line 537 to the ports 519" and 521" of the third cut-off valve 531. The first brake apply line 309 is connected to the ports 516" and 517" of third cut-off valve 531. Thus, whenever fluid is supplied to either the transfer line 537 or the first brake apply line 309, fluid is connected to spaced outlet ports 532 or 533 to supply the lockup clutch feed line 283. Valve 531 has outlet ports 532 and 533 spaced about the length of the valve element 514" so that fluid pressure being exhausted remains connected to the lockup feed line 283 substantially until the fluid pressure being increased is connected when this valve acts to provide a time delay. Thus, this valve provides a longer lockup clutch exhaust period. Whenever fluid is supplied to any of the first, second, third or fourth apply lines on a shift from a next higher or lower speed drive, there is a calibrated time delay before fluid is supplied to the lockup clutch feed line. In normal shifting between N and the forward ranges, lockup disconnect and subsequent apply is controlled during the shifts one-two, three, three-four, four-three, three-two, two-one and will be controlled respectively by orifices 521", 516', 516, 521, 521' and 516", so if different time delays are required each orifice may be sized to provide a proper time delay for each shift. After reverse drive only, cut-off valve 512 will be differently positioned so a two-three shift will, only on the first shift, have a longer delay. This is not a problem but could be avoided by connecting reverse line 195 by a shuttle valve not shown to line 436 downstream of valve 512.

RETARDER VALVE

The retarder valve 541 controls the operation of the hydrodynamic brake 30. There is a valve element 542 having lands a, b and c of equal diameter located in a bore 543 and is biased to the brake-off position shown by pressure located in a chamber 558. In brake-off position, the retarder in-line 548 is connected between the lands a and b to the restricted exhaust line 549 connected to exhaust 547. The cooler out-line 154 is blocked by land b, the retarder out-line 551 is connected between lands b and c to exhaust 552 and via exhaust passage 553 to exhaust 554. Converter out-line 156 is connected by branch 556 and blocked by land c. The main line 117 is connected by a restriction 557 to the chamber 558 at the end of bore 559 having a plug 561 therein which acts on the valve element 542 when chamber 558 is pressurized. The manually controlled solenoid valve 560 is normally spring closed to pressurize chamber 558 and position the brake valve 542 in the position shown, the brake-off position. When the solenoid valve 560 is energized to vent chamber 558, the spring 544 moves the valve 542 to the left, to the brake-on position, connecting cooler out-line 154 to retarder in-line 548, and retarder out-line 551 to the branch 556 of converter out or cooler in-line 156. Retarder out-line 551 always connects to a spring loaded pressure relief valve 564 or torque limiter valve which regulates the retarder out-pressure at a low value to provide a controlled amount of hydrodynamic braking.

OPERATION

When engine driving this transmission is running, the transmission input driven pump 112 FIG. 6, supplies fluid under pressure to the main line 117 which is regulated at a normal line pressure value, i.e. 180 psi when the transmission is in forward drive and forward drive knockdown pressure is supplied via line 136 to the regulator valve and at a higher reverse drive pressure i.e. 300 psi in reverse drive when this knockdown pressure is not supplied. The regulator valve exhaust line 136 is connected through restriction 137 to the lubrication line 138 which lubricates the transmission gearing and supplies fluid to the pitot tube governor 267. The exhaust line 136 is maintained above a lower pressure value i.e. 80 psi to properly feed the lubrication system and excess fluid is then bypassed by lubrication regulator valve 139 to the converter feed line 146 which is also supplied with fluid by a second input pump 147. The converter feed pressure in line 146 is regulated at a low pressure, i.e. 62 psi by the converter by-pass valve 150 which bypasses overage to the cooler outlet line 154. The converter outlet flow in line 156 passes through the cooler 160 to the cooler outlet line 154. The converter regulator valve 157 regulates the cooler outlet line at a low pressure, i.e. 25 psi to control converter outlet pressure. When the brake valve 541, FIG. 2, is in the brake-on position, the cooler outlet line is connected to supply the hydrodynamic brake 267 at the pressure regulated by the converter regulator valve. In the brake-off position, shown, the cooler outlet line 154 is blocked and overage fluid flows via exhaust 161 to sump 111.

In neutral position, the manual selector valve 191 supplies fluid to the forward knockdown line 136 and the signal feed line 194 and the other lines, reverse 195, low 197, first 198, second 199 and third 201 drive lines are connected to exhausts 196 or 202 directly, while the drive four line 203 is connected to the hold feed line 204 and both are exhausted via the hold regulator valve 209 and the drive three feed line 201 to exhaust 202. As explained above, the trimmer regulator valve 441 will supply trimmer regulator pressure to line 452, the modulator pressure regulator valve 241 will provide modulator pressure in line 248 inversely proportional to torque demand and the transmission output governor valve 223 will provide a governor signal in line 236 that is a function of output speed. The hold pressure regulator valve is not supplied and thus there is no hold pressure in line 217 and there is no detent pressure in line 174. Also the pitot tube governor 267 provides a converter output speed signal in line 270 that is a function of converter output speed.

Normally when the selector valve is in neutral position the output or vehicle driven thereby will be stationary or nearly so and the engine is running to pressurize the system as pointed out above, the output governor pressure and modulator pressure will be insufficient to overcome the downshift bias of the springs so the one-two, two-three and three-four shift signal valves 316, 341 and 358 will be in the downshift position connecting the two, two-three and three-four shift signal lines 322, 354 and 371 to exhausts 323, 353 and 372 respectively. The main line 117 is directly connected to each shift signal valve and blocked by land b thereof. Since there are no shift signal pressures the one-two, two-three and three-four relay valves 378, 406 and 424 are spring biased to the downshift or lower speed position. Since there is no low drive pressure in line 197, the low one shift valve 298 is spring biased to the higher or first speed position. The main line is then directly connected by restriction 399 and the downshifted one-two relay valve 378 to the low one shift line 307 which is connected by the upshifted low one shift valve 298 to the first brake apply line 309 to engage the first brake 89. Thus, when the engine is running and selector valve 191 is in neutral position, the torque converter is filled, the hydrodynamic brake control system is operative, and at slow output speed, the first brake engaged and all other drive establishing devices disengaged for a positive neutral and the automatic shift control system is ready for operation.

If the output or vehicle is coasting at higher speeds, with the selector valve 191 inadvertently in neutral and the engine running, the automatic output governor and modulator pressure control system will function as during automatic shifting described below to position the shift signal valves and relay valves in accordance with speed and torque demand. When the one-two relay valve 378 upshifts, first brake apply line 309 is connected by the low one shift valve 298 to the low one shift line 307 which is connected by the one-two relay valve 378 to exhaust 402 to disengage the first brake 89. Since drive four line 203 is exhausted at the selector valve in neutral position, the second and third brakes and fourth clutch cannot be applied. Thus on movement of the selector valve to a drive position, the forward clutch will be engaged and the priority valve 392 will supply fluid to then engage the drive speed selected by the automatic controls. The drive and coasting shift engagement sequence is the same, the drive always being completed by the second, third or fourth speed engagement device.

On shifting the manual selector valve 191 to the drive four position DR4 at output speeds and torque demand values insufficient to upshift the one-two shift signal valve 316, the main line 117 is directly connected to the drive four line 203 to directly supply fluid to engage the forward clutch 51 to engage the first speed drive since the first brake 89 was engaged in neutral and remains engaged. Thus when the output or vehicle is standing or moving very slow the forward clutch initiates the drive on a neutral to drive four position or any forward drive position. The drive four line also supplies fluid to the priority valve 392 which feeds the drive four priority line 393 which in the first speed position of one-two relay valve 378 is blocked by the land b.

The other drive establishing devices are exhausted to disestablish the other drives. The low brake apply line 294 is connected by upshifted low one shift valve 298 to exhaust 305, 306. The second speed brake apply line 419 is connected by the downshifted two-three relay valve 406, via check valve branch 418' to one-two shift feed line 398 which is connected by downshifted one-two relay valve 378 to the exhaust line 306 for disestablishing the second speed brake 82. The third speed brake apply line 436 is connected by the downshifted three-four relay valve 424 to the restricted branch 435 and check valve branch 435' to the two-three shift feed line 415 which is connected by the downshifted two-three relay valve to the exhaust branch 416 and line 306 to disengage third brake 76. The fourth speed clutch apply line 432 is connected via the downshifted three-four relay valve 424 to the reverse line 195 which is connected to exhaust at the selector valve 191 to disengage the fourth clutch 63.

When the speed of the vehicle increases, so that governor pressure in line 236 upshifts the one-two shift signal valve 316 against the spring bias reduced by modulator pressure from line 248, the exhaust 323 is closed and the main line 117 supplies pressure to the one-two shift signal line 322 which acts in chamber 401 to upshift the one-two relay valve 378 from the downshifted position against the spring bias to the upshifted position. Upshifted one-two relay valve 378 connects the low one shift line 307 which had engaged first speed via the low one shift valve 298 to the exhaust line 306 to disengage first speed and connect the priority main line 393 between lands a and b to the one-two shift feed line 398 which is connected by the restricted branch 418, the check valve branch 418' being closed, between the lands b and c of the downshifted two-three relay valve 406 to the second brake apply line 419 for engagement of the second speed.

At a higher speed, governor pressure similarly upshifts the two-three shift signal valve 341 which will disconnect the second third shift signal line 354 from exhaust 353 and connect it to main line. The second third shift signal line 354 is connected to chamber 422 of two-three relay valve 411 to upshift this valve to the upshift position connecting the second brake apply line 419 by restricted exhaust 421 to the low pressure exhaust line 306 and connects the unrestricted branch 417 of the one-two shift line 398 to the second third shift feed line 415 which is connected via restricted branch 435, the check valve branch 435' being closed, and between the lands b and c of downshifted three four relay valve 424 to the third brake apply line 436 to engage third speed drive.

At a still higher speed the governor pressure will upshift the three-four shift signal valve 358 to disconnect the three-four shift signal line 371 from exhaust 372 and connect it to main line 117 to supply pressure to the chamber 438 to upshift the three-four relay valve 424. This upshifted relay valve will then connect third brake apply line 436 to restricted exhaust 437 and the low pressure exhaust line 306 and connect the two-three shift feed line 415 via restriction 434 to the fourth clutch apply line 432 to engage fourth speed drive.

Since the drive four line via the priority valve 392 and priority drive four line 393 sequentially feeds the one-two, two-three and three-four relay valves only one of the first, second, third and fourth speeds can be engaged and failure of any shift relay valve to upshift will prevent engagement of all higher speed drives. Since the shift signal valves upshift sequentially with increasing speeds, the drives will be changed in this sequence.

A reduction of governor pressure and/or modulator pressure will effect a downshift of the shift signal valves sequentially, the three four shift signal valve, the two-three shift signal valve and then the one-two shift signal valve to provide the reverse of the above described upshifting operation and thus provide downshifting in this sequence.

During quick deceleration where substantially simultaneous downshifting of the two higher shift signal and relay valves may occur, the drive speed of the lowest relay valve that is downshifted will be established and thus a four to second or first speed shift can occur.

The lockup clutch 23 is engaged in each forward ratio by the lockup valve 271 when upshifted by input governor pressure in line 269 supplied by the pitot tube governor 267 acting against the modulator pressure modified spring bias to engage the lockup clutch in each ratio when the torque converter output speed indicates the torque converter is operating in the coupling range and a shift change is not in progress. When a range shift change is in progress the lockup feed line is briefly exhausted to one of the exhausted apply lines and after a time delay supplied with main line pressure from the one pressurized apply line by the lockup cut-off valves as explained above. Only one of the first speed apply line 309, the second speed apply line 419, the third speed apply line 436 or the fourth speed apply line 432 is pressurized in forward drives and the others exhausted. The two highest drive apply lines are connected to a first cut-off valve which is connected with the next lower speed apply line to the next sequentially connected cut-off valve. Thus normally on each shift between forward drives, there is predictable valve movement first exhausting and then, after a predetermined delay, feed to the lockup feed line 283. When fluid is supplied by lockup feed line 283, the upshifted lockup valve 271 connects this line to the lockup apply line 281 to engage the lockup clutch. In the downshift position, lockup apply line 281 is connected to exhaust 282.

When the throttle pedal is in the through detent position which may be either just prior to, at, or just beyond full throttle position, through detent valve 162 supplies to the detent line 174 fluid at a regulated pressure to each of the four-three shuttle valve 327, three-two shuttle valve 357 and two-one shuttle valve 332. If the hold feed pressure supplied by line 204 in the manual valve via the drive three line 201, drive two line 199 and drive one line 198 respectively is present in any of these valves, the detent pressure being lower will be blocked but otherwise detent pressure will be transmitted to the shift valves. However, if the hold feed pressure is not present in any of these valves, the detent pressure will, as explained above, move the ball 333 from the detent line seat 335 to the hold feed pressure seat 336 and the detent pressure will be connected to the downshift line connected to that shuttle valve. As pointed out above, the four-three downshift line 375, the three-two downshift line 355 and the two-one downshift line 329 are respectively connected to the three-four shift signal valve 358, the two-three shift signal valve 341 and the one-two shift signal valve 316 and will provide up and down shifts of each of these shift valves at a higher speed than the normal shift speeds and remove the normal downshift bias by the spring modified by modulator pressure.

Movement the manual selector valve 191 to the drive three position DR3, in addition to supplying previously supplied signal feed line 194, forward knockdown line 136 and drive four line 203 also feeds the hold feed line 204 and blocks the exhaust of the drive three feed line 201. Thus the hold pressure is regulated by the hold regulator valve 291 when supplied with main line pressure by the hold feed line 204 and supplies hold pressure via line 217 to the drive three feed line 201 which is connected by four-three shuttle valve 377 regardless of the presence or absence of detent pressure to the four-three downshift line 375 which will downshift the three-four shift signal valve at a higher speed than detent pressure. The shift valves control the slave valves for shifting the transmission as in automatic drive but up and downshifts from third to fourth speed occur at a speed higher than detent shift speed. Thus normal power driving would be limited to first to third speeds but coast upshifts to fourth are permitted.

Movement of the manual selector valve 191 to the drive two position DR2 will additionally interconnect the drive three line 201 to supply hold pressure to the drive two line 199 which will be connected by the three-two shuttle valve 357 to the three-two downshift line 355 which similarly acts on the two-three shift signal valve 341 to control the two-three relay valve 406 for shifting the transmission at a higher speed than detent shifting, so normal power one-two shifts are provided with coast upshifts to third and fourth.

Movement of the manual selector valve 191 to the drive one position DR1 additionally connects hold pressure from drive three feed line 201 to the drive one line 198 which is connected by the two-one shuttle valve 581 to the two-one downshift signal line 329 which acts on the one-two shift signal valve 316 to control the one-two relay valve 378 to shift the transmission between first and second speeds at higher speeds than the detent downshift to normally hold first speed but permit coast upshifts.

Further downshift of the selector valve 191 to the low position LOW will connect the hold pressure in the drive three feed line 201 to the low drive line 197 which at low speeds, proper for such a downshift, will be connected by the low one inhibitor valve 286 to the low one shift signal line 292 which will downshift the low one shift valve 298 to the low position connecting first apply line 309 to exhaust and connecting the low one shift signal line 307 via branch 312 to the low brake line 294 to establish low ratio. The low speed apply pressure line 294 is connected to closed spring chamber 295 of the low one inhibitor valve 286 so an increase in speed while the transmission is operating in low speed drive will not cause an upshift to first speed drive. If the transmission output or vehicle speed is too high for a proper first speed drive to low speed shift, governor pressure in line 236 will actuate low one inhibitor valve 286 to block low drive pressure line 197 and connect the low one shift signal line 292 to exhaust 293 to prevent a downshift of the low one shift valve 298. This proper speed for a first to low shift is less than lockup speed.

Movement of the selector valve 191 from the low position to the drive one position will permit a manual upshift from low to first speed drive. Such shifts above the inhibitor speed only occur during coasting and there is no disengagement of the lockup clutch. Further movement of selector valve 191 in an upshift direction through the drive ranges will permit upshifts to the last drive speed included in each range at normal shift speeds and shifts to higher speeds at the higher hold shifting speed.

In order to make a shift to reverse the selector valve must be first moved to neutral, placing the control system in the above described neutral condition, and then to reverse R. In the reverse position R, the selector valve 191, exhausts the drive four line 203 and forward knockdown line 135 through the hold feed line 204, the hold regulator valve 209 and drive three line 201 to exhaust 202. Exhausting the forward knockdown line 135 causes main pressure regulator valve 119 to increase main line pressure in line 117 to a higher value, i.e. 300 psi. Exhausting the drive four line 203 as in neutral prevents establishing of the forward clutch 51, the the second brake 82 and the third brake 76. It also exhausts the normal forward drive feed through the relay valves, which through the two-three shift line 415 with the three-four relay valve 424 upshifted feeds the fourth clutch apply line 432 or when downshifted the third brake apply line 436. To establish reverse drive the three-four relay valve must be in the downshifted or third speed position. Then the selector valve 191 in reverse position connects main line 117 to reverse line 195, which with the three-four relay valve 424 in the downshift position, is connected to the fourth clutch apply line 432 to engage the fourth clutch. In addition, to establish reverse, the first brake 89 must be applied. If the transmission output is running at speeds sufficient to call for establishment of second or higher speeds by the automatic control system exhausting the drive four line 203 places the transmission in neutral. When the speed reduces to a very low value sufficient for a downshift of the one-two signal valve 316 and one-two relay valve 378, the latter connects main line 117 through the low first shift line 307, the low one shift valve 398, the first brake apply line 309 to engage first brake 89 to establish reverse drive.

In reverse, the lockup cut-off valves are non-functional since there are no shifts and it is immaterial whether there is a lockup feed pressure in line 283 since the lockup valve 271 does not shift because reverse speed in insufficient.

It should be noted that during range shifts between first, second, third and fourth speeds, each of these speeds is established by a feed respectively through only one of the restrictions 399, 418, 435 or 434 which is the proper size flow controlling passage portion for that shift. In the lower speed relay shift valves only the low speed inlet is restricted and in the highest speed relay shift valve both the low and high speed inlets are restricted. These restrictions control *or determine* the total restriction of the line or flow passage to each ratio motor during the engagement thereof on both upshifts and downshifts, to control the flow in accordance with the requirements of each motor which are different from each other due to motor volume, whether the motor is rotary or stationary and the shift characteristics, to provide good shift characteristics. Also each relay valve has a low and a high exhaust. On upshifts to the next higher speed, the first, second and third speed devices are exhausted respectively by low exhausts having restrictions 402, 421 and 437 so each restriction is properly sized to control the disengagement of the previously engaged lower speed. On downshifts to the next lower speed the exhaust from second, third and fourth is respectively through (second) substantially free clutch valve passage 418' and a free or restricted high exhaust 306 of one-two relay valve 378, (third) check valve passage 435' and free or restricted high exhaust 416 of the two-three relay valve 406 and (fourth) free high exhaust to reverse feed restriction 208 which is quite large or may be a free passage with check valve ball 207. The check valve passages 418' and 435' provide a free exhaust or return bypass, respectively, of restricted inlets 418 and 435 and prevent feed flow bypassing restricted inlets 418 and 435 so they control ratio establishment. The check valves have a ball which seats on and seals the outlet to its inlet line between the restriction and the valve supplied during feed flow but during return or exhaust flow the ball cannot seat on the other port leading to the inlet line, now used as an exhaust on the other side of the restriction, providing bypass flow of the restriction. Thus on upshifts which are under power both the feed and exhaust for both establishment and disestablishment of each speed drive are individually timed by a particular restriction. On a downshift the inlet restrictions 418 and 435 are suitable but the paralleled free return check valve respectively 418' and 435' provide a free return so on a downshift each speed device is controlled by its own preselected downshift exhaust.

Thus, for engagement of each speed device the feed on both upshift and downshift is through a preselected restricted passage having a calibrated restriction for each speed and excluding or bypassing the calibrated feed and exhaust restrictions for the other speeds. The exhaust passages for disengagement during both upshift engagement of a higher speed and downshift engagement of a lower speed, each have a preselected calibrated restriction for each speed, one for upshift and one for downshift, and each exhaust passage excludes all feed restrictions and any other exhaust restrictions. Exhaust restriction requirements for each motor differ for similar reasons as stated above for feed requirements but the downshift exhaust requires a higher flow rate, less restriction than either upshift exhaust or feed for good shift timing. Thus in building a transmission, the restriction of each downshift exhaust passage is the least so it is desirable to build these passages to provide the proper large flow rate downshift exhaust passage for each motor, rather than place separate restrictions in these passages but restrictions could be used at each slave valve. Since it is most convenient to make all the lines about this same size, the lower flow rate for upshift exhaust and feed is provided by separate restrictions, all located at the slave valve ports. This is shown for all power shifts below.

| Shift | Sole Feed Engaging Restriction | Speed | Speed Disengaged | Sole Exhaust Restriction and/or Passage |
|---|---|---|---|---|
| N-1 | 1 | 399 | N | |
| 1-2 | 2 | 418 | 1 | 402 |
| 2-3 | 3 | 435 | 2 | 421 |
| 3-4 | 4 | 434 | 3 | 437 |
| 4-3 | 3 | 435 | 4 | 195 |
| 3-2 | 2 | 418 | 3 | 416 |
| 2-1 | 1 | 399 | 2 | 305 |

In the above description, references to a direction of the valve on the drawing as right or left is merely for convenience and it will be appreciated that the location and relative arrangement of the valves is not important but that they perform the above described functions in any position except for the lockup cut-off valves and shuttle valves.

It will be appreciated that the invention may be used in the above described preferred embodiment and modifications thereof.

It is claimed:

1. In a transmission; input means; output means; multispeed gear means connecting said input and output means and having a plurality of fluid operated drive devices including a main fluid operated forward drive establishing device and a first, intermediate and high individual speed fluid operated forward drive establishing devices sequentially operative when said main forward drive device is established to establish first, intermediate and high, a series of increasing speed forward drives and two of said fluid operated drive devices including at least one of said forward drive devices establishing an additional drive; a source of fluid under pressure; shift valve means including a first and second shift valve each having a supply port; said first shift valve operative in a downshift position for connecting its supply port to said first speed individual fluid operated speed drive establishing device and operative in an upshift position for connecting the supply port of said first shift valve to the supply port of said second shift valve; said second shift valve operative in a downshift position for connecting its supply port to establish said intermediate individual speed drive establishing device and operative in an upshift position for connecting its supply port to establish said high drive establishing device; automatic control means operative in response to output speed for sequentially upshifting said first and second shift valves with increasing output speed and selector valve means operative in an automatic position for connecting said source to said forward drive device and said supply port of said first shift valve for establishing automatic shifting between said first, intermediate and high forward drives and an additional drive position connecting said source to said shift valve means and to one of said two drive devices for said additional drive for establishing said one drive device and conditioning said shift valve means for supplying fluid for the other of said two drive devices for said additional drive, to establish said additional drive through said first shift valve only when placed in the downshifted position by said automatic control means.

2. The invention defined in claim 1 and said additional drive being a reverse drive; said one drive device for said additional drive being said high drive device and said selector valve means in said additional drive position connecting said source to said second shift valve to establish said high drive device and said other drive device for said additional drive being said first drive device.

3. The invention defined in claim 1 and said additional drive being a low drive; said one drive device for said additional drive being said main forward drive device and said other drive device for said additional drive being a low drive device.

4. The invention defined in claim 1 and said additional drive being a low drive; said other drive device for said additional drive being a low drive device; said shift valve means including an additional shift valve and said first shift valve in said downshifted position connecting said source to said additional shift valve which selectively feeds said first drive device when said selector valve is in said automatic position and feeds said low drive device when said selector valve is in said additional position.

5. The invention defined in claim 4 and governor controlled inhibitor means connected to said additional shift valve means to prevent downshift of said additional shift valve means above a predetermined speed, a torque converter having an output and lockup clutch in series with said multispeed gear means between said output and input means, governor shift means responsive to the speed of said torque converter output only above a higher predetermined speed to engage said lockup clutch to prevent lockup clutch engagement in said low ratio.

6. In a transmission; input means; output means; multispeed gear means connecting said input and output means and having a plurality of fluid operated drive devices including a fluid operated main forward drive establishing device and a first, intermediate and high individual speed fluid operated forward drive establishing devices sequentially operative when said forward drive device is established to establish first, intermediate and high, a series of increasing speed forward drives and two of said fluid operated drive devices including at least one of said forward drive devices operative for establishing an additional drive; a source of fluid under pressure; relay valve means including a first and second relay valve each having a supply port; said first relay valve operative in a downshift position for connecting said source to said first speed individual fluid operated speed drive establishing device and operative in an upshift position for connecting the supply port of said first relay valve to the supply port of said second relay valve; said second relay valve operative in a downshift position for connecting its supply port to establish said intermediate individual speed drive establishing device and operative in an upshift position for connecting its supply port to establish said high drive establishing device; governor means providing a governor signal; automatic shift valves for each relay valve means each operative in response to said governor signal for sequentially each providing a shift signal for upshifting said first and second relay valves with increasing output speed and selector valve means operative in an automatic position for connecting said source to said main forward drive device and to said supply port of said first relay valve for establishing automatic shifting between said first, intermediate and high forward drives and an additional drive position connecting said source to said relay valve means and to one of said two drive devices for said additional drive for establishing said one drive device and conditioning said relay valve means for supplying fluid for establishing the other of said two drive devices for said additional drive to establish said additional drive through said first relay valve only when placed in the downshifted position by said automatic control means.

7. The invention defined in claim 6 and said additional drive being a reverse drive; said one drive device for said additional drive being said high drive device and said selector valve means in said additional drive position for reverse drive connecting said source to said second relay valve to establish said high drive device and said other drive device for said additional drive being said first drive device.

8. The invention defined in claim 7 and said second relay when downshifted having an exhaust connected to the high establishing device; said selector valve means in reverse drive position connecting said source to said exhaust connected by the downshifted second relay valve to the high establishing device and to the supply port of said first relay valve for establishing said first drive device only on downshift of said first relay valve so reverse drive cannot be established above the speed for first drive.

9. The invention defined in claim 6 and said additional drive device being a low drive device; a low relay valve in the connection between said first relay valve normally in an upshift position providing a connection to said first device and in a downshift position to said low device; said selector valve means in said additional position connecting said source to said forward drive device and to said supply port of said first relay valve means and said source to said low relay valve to move it to downshift position to establish low only when said first relay valve is downshifted.

10. In a transmission; input means; output means; multispeed gear means connecting said input and output means and having a plurality of fluid operated drive establishing devices including a forward drive establishing device and a first, second and third individual fluid operated speed drive establishing devices sequentially operative when said forward drive device is established to establish a series of increasing speed forward drives; a source of fluid under pressure; a drive pressure line having priority means to delay fluid pressure flow therethrough; first and second shift valves; automatic shift means to sequentially upshift said first and second shift valves with increasing output speed; said first shift valve operative in a downshift position to provide a connection connecting said source to said first speed individual drive device for establishing said first speed device whenever the output is stationary or coasting at speeds less than the speed required to upshift said first shift valve and in an upshift position to connect said drive pressure line to a second of said shift valves; said second shift valve in a downshift position feeding said second drive device and in an upshift position feeding said third drive device; manual selector valve means operative in a neutral position connecting said drive pressure line to exhaust to prevent establishment of second and third speeds so said first speed device is only established when the output is stationary or coasting at speeds less than the speed required to upshift said first shift valve and an automatic drive position to connect said source to said drive pressure line and to said forward drive device for engaging said forward drive device for completing the drive when the vehicle is stationary or coasting at a speed less than the speed required to upshift said first shift valve and for first engaging said forward drive device and then engaging the one of second or third drive device when coasting at high speeds in accordance with the automatic shift means control of said second shift valve.

11. The invention defined in claim 10 and said priority means being a pressure responsive valve permitting flow therethrough in said drive pressure line when the upstream pressure is sufficient for proper operation of said individual fluid operated devices.

12. The invention defined in claim 10 and said multispeed gear means being operative on the establishment of said first and third speed drive establishing devices and the disestablishment of said forward drive device to establish reverse drive; said selector valve means being operative in a reverse position to exhaust said drive pressure line and connect said source pressure to said second shift valve to establish said third speed drive establishing device and reverse being established when said first shift valve automatically downshifts to establish said fluid operated device.

13. The invention defined in claim 11 and said multispeed gear means being operative on the establishment of said forward fluid operated device and an additional low speed fluid operated device to establish an additional low speed; an additional shift valve in said connection between said first shift valve and said first speed device having an upshift position providing a connection to said first speed device to establish first speed and a downshift position providing a connection to said lower speed device to establish said lower speed and said selector valve having a low position connecting said source to said forward drive device and acting on said additional low shift valve to downshift it.

14. The invention defined in claim 13 and governor means to prevent downshift of said additional low speed shift valve by said selector valve above a predetermined speed.

15. In a transmission; input means; output means; multispeed gear means connecting said input and output means and having a fluid operated forward drive establishing device and a plurality of individual fluid operated first through fourth speed drive establishing devices sequentially operative when said forward drive device is established to establish a series of increasing speed forward drives; a source of fluid under pressure; a plurality of shift valves including first, second and third shift valves each having a supply port; said first shift valve selectively connecting a first supply port to said first and second individual drive establishing devices when downshifted and upshifted respectively; said second shift valve selectively connecting said source to the supply port of said first shift valve and its second supply port to the supply port of said third shift valve when downshifted and upshifted respectively; said third shift valve connecting said third supply port selectively to a third and a fourth individual drive establishing device when downshifted and upshifted respectively; automatic control means responsive to the speed of said output means and torque demand operative to sequentially upshift and downshift said second and third shift valves and selector valve means operative in a forward automatic range position to connect said source to said forward drive establishing device and said supply port of said second shift valve and position said first shift valve for second drive and permitting automatic shifting of said second and third shift valves by said automatic control means and operative in a first drive position to discontinue the supply from said source to said supply port of said second shift valve to prevent the establishment of said third and fourth speed devices and position said first shift valve in the downshift position to establish said first drive establishing device.

16. The invention defined in claim 15 and said multispeed gear means being operative on the establishment of said second and fourth speed drive establishing devices and the disestablishment of said forward drive establishing device to establish reverse drive; said manual selector valve means being movable to a reverse position exhausting said drive pressure line, connecting main line pressure to said third shift valve to establish said fourth drive establishing device and upshifting said first shift valve for operation on the automatic downshift of said second shift valve to directly connect said source to said first shift valve which in the upshift position establishes said second speed device which with the established fourth speed device provides reverse drive.

17. The invention defined in claim 16 and said automatic control means including an output governor providing an output governor signal, a torque demand means providing a signal proportional to torque demand and automatic shift valve means for each of said second and third shift valves operative in response to said governor signal and said torque demand signal to provide first and second upshift signal at low and high ranges of speeds increasing with torque demand and a discontinuance of said signal at low and high ranges of speeds increasing at a faster rate with torque demand and said shift valves being relay shift valves and said second and third relay valves being respectively responsive to said first and second upshift signals.

18. The invention defined in claim 16 and a hold pressure regulator valve providing a hold signal pressure and said selector valve connecting said hold signal pressure to said first shift valve to downshift said first shift valve in said first drive position and having a second automatic range connecting said hold signal pressure to said automatic control means to provide upshifts of at least one shift valve at higher speeds.

19. In a transmission; input means; output means; multispeed gear means having low, first intermediate, second intermediate and high speed drive establishing devices connecting said input and output means; a source of fluid under pressure; a low, intermediate and high shift valve means each having an inlet port means, a low and a high outlet port and exhaust port means and biasing means biasing said shift valve means to low position connecting said inlet port means to said low outlet port and said high outlet port to said exhaust port means and having fluid pressure responsive means to shift said shift valve means to high position connecting said inlet port means to said high outlet port and said low outlet port to said exhaust port means; first passage means connecting said source to said inlet port means of said low shift valve means; second passage means connecting said low outlet port means of said low shift valve means to said low speed device; third passage means connecting said high outlet port of said low shift valve means to said inlet port means of said intermediate shift valve means; fourth passage means connecting said low outlet port of said intermediate shift valve means to said first intermediate speed device; fifth passage means connecting said high outlet port of said intermediate shift valve means to said inlet port means of said high shift valve means; sixth passage means connecting said low outlet port of said high shift valve means to said second intermediate speed device and seventh passage means connecting said high outlet port of said high shift valve means to said high speed device.

20. The invention defined in claim 19 and said inlet port means including a high inlet port connecting said high outlet port when the shift valve means is in high position and a low inlet port connecting to said low outlet port when the shift valve means is in low position and each high inlet port having more restriction.

21. The invention defined in claim 20 and said low inlet port of said high shift valve means having a restriction.

22. The invention defined in claim 19 and said exhaust port means including a high exhaust port connected to said high outlet port when the shift valve means is in low position and a low exhaust port connected to said low outlet port when the shift valve means is in high position and said low exhaust port being more restricted.

23. The invention defined in claim 20 and said exhaust port means including a high exhaust port connected to said high outlet port when the shift valve means is in low position and a low exhaust port connected to said low outlet port when the shift valve means is in high position and said low exhaust port being more restricted.

24. In a transmission; input means; output means; multispeed gear means connecting said input and output means and having a fluid actuated forward drive establishing device actuated in all forward drives and a plurality of fluid actuated individual speed drive devices individually actuated to provide when the forward drive device is actuated a series of forward speed drives; a source of fluid under a regulated pressure; governor means connected to said source and providing a governor pressure proportional to transmission speed; automatic shift valve means responsive to said governor pressure to sequentially upshift for sequentially engaging said individual fluid actuated forward speed drive devices; priority valve means operative in response to normal pressure to permit flow of the normal pressure and in response to less than normal pressure to reduce flow; and manual control means connecting said source directly to said fluid actuated forward drive device and through said priority valve means to said automatic shift valve means so the source pressure is maintained at said normal pressure in order to maintain proper system pressures.

25. The invention defined in claim 24 and an additional fluid actuated individual speed drive device; an additional shift valve operative in one position to supply said additional speed drive device and in another position to supply one of said individual speed drive devices; said automatic shift valve means in one position being connected through said additional shift valve means to supply fluid from said source to selectively actuate said additional fluid actuated device and said one of said individual speed drive devices and said manual control means connecting said source pressure to said additional shift valve to select said additional and said one fluid actuated speed drive devices.

26. In a transmission; input means; output means; multispeed gear means connecting said input and output means and having in series a first, second and third increasing speed drive establishing devices; a source of fluid under pressure; first and second shift valve means each having a first and a second inlet port, a first and a second outlet port and exhaust port means; said first shift valve means having both inlet ports connected to said source and said first outlet port connected to said first speed drive device and operative in a downshift position to connect its first inlet port to its first outlet port and in an upshift position to connect its second inlet port to its second outlet port, and said second shift valve means having both of its inlet ports connected to said second outlet port of said first shift valve means, its first outlet port connected to said second speed drive device and its second outlet port connected to said third speed drive device and being operative in a downshift position to connect its first inlet port to its first outlet port connected to said second speed drive device and in an upshift position to connect its second inlet port to its second outlet port connected to said third speed drive device, said first inlet port of said first shift valve means having a flow capacity controlling only the flow for said first speed drive device; said first inlet port of said second shift valve having a flow capacity controlling only the flow for said second speed drive device and said second inlet port of said second shift valve having a flow capacity controlling only the flow for said third speed drive device.

27. The invention defined in claim 26 and said first shift valve means having exhaust port means including a first exhaust port for controlling the flow capacity of only the connection of said first speed drive device to exhaust after moving from the downshift position to the upshift position.

28. The invention defined in claim 26 and said second shift valve means having exhaust port means including a first exhaust port for controlling the flow capacity of only the connection of said second speed drive device to exhaust after moving from the downshift position to the upshift position.

29. The invention defined in claim 26 and said second shift valve means having exhaust port means including a second exhaust port controlling the flow capacity of only the connection of said third speed drive device to exhaust after moving from the upshift position to the downshift position.

30. In a transmission; input means; output means; multispeed gear means connecting said input means and output means and having in a consecutive speed drive series first, second and third increasing speed drive establishing devices; a source of fluid under pressure; shift valve means selectively connecting said source to said first, second and third devices having feed passages for feed flow for selectively establishing the respective first, second and third speed device, a first and a second flow controlling upshift exhaust passage portions, each only for exhaust flow for dis-establishing respectively said first and second device during upshifts from first to second and second to third speeds and a second and a third flow controlling downshift exhaust passage portions, each only for exhaust flow for disestablishing respectively said second and third device during downshifts from third to second and second to first speeds; each upshift and downshift flow controlling exhaust passage portion being independent of the other flow controlling upshift and downshift exhaust passage portions.

31. The invention defined in claim 30 and each of said flow controlling upshift exhaust passage portions being more restricted than the flow controlling downshift exhaust passage portion for the same speed device providing a slower disestablishment rate on upshift than on downshift.

32. The invention defined in claim 30 and said flow controlling upshift and downshift exhaust passage portions being independent of said feed passages.

33. In a transmission; input means; output means; multispeed gear means connecting said input means and output means and having in a consecutive speed drive series first, second and third increasing speed drive establishing devices; a source of fluid under pressure; shift valve means selectively connecting said source to said first, second and third devices having a first, a second and a third flow controlling feed passage portions, each only for feed flow to and for establishing the respective first, second and third device for providing a controlled establishing rate for each device independent of the establishing rate of the other devices, a first and a second flow controlling upshift exhaust passage portions, each only for exhaust flow for disestablishing respectively said first and second device during upshifts from first to second and second to third speeds and a second and a third flow controlling downshift exhaust passage portions, each only for exhaust flow for disestablishing respectively said second and third device during downshifts from third to second and second to first speeds; each upshift and downshift flow controlling exhaust passage portion being independent of the other flow controlling upshift and downshift exhaust passage portions and said flow controlling feed passage portions, each of said flow controlling upshift exhaust passage portions being more restricted than the flow controlling downshift exhaust passage portion for the same speed device providing a slower disestablishment rate on upshift than on downshift and said flow controlling feed passage portions being independent of said flow controlling upshift and downshift exhaust passage portions.

34. The invention defined in claim 33 and said first, second and third flow controlling feed passage portions being more restricted than said flow controlling downshift exhaust passage portions.

35. In a transmission; input means; output means; multispeed gear means connecting said input and output means and having in consecutive series a first, second and third increasing speed drive establishing devices; a source of fluid under pressure; first and second shift valve means each having inlet passage means, a first and a second outlet passage and exhaust passage means; said first shift valve means having its inlet passage means connected to said source and its first outlet passage connected to said first speed drive device and operative in a downshift position to connect its inlet passage means to its first outlet passage to feed and establish said first speed device and connect its second outlet passage to its exhaust passage means and in an upshift position to connect its inlet passage means for feed flow to its second outlet passage and its first outlet passage to its exhaust passage means to exhaust and disestablish said first speed device, and said second shift valve means having inlet passage means having a first restricted inlet passage with a bypass blocking feed flow and permitting return flow and a second restricted inlet passage, both connected to said second outlet passage of said first shift valve means, its first outlet passage connected to said second speed drive device and its second outlet passage connected to said third speed drive device and being operative in a downshift position to connect its first restricted inlet passage to its first outlet passage connected, when said first shift valve means is upshifted for feed to and for establishing said second speed drive device and, when said first shift valve means is downshifted for exhausting through its first restricted inlet passage and its bypass to the second outlet passage and exhaust passage means of said first shift valve means and connecting said third speed drive device to its exhaust passage means and in an upshift position to connect its second restricted inlet passage to its second outlet passage for feed to said third speed drive device and connecting said second speed drive device by its first outlet passage to its exhaust passage means and said first inlet passage of said second shift valve having a flow capacity controlling only the feed flow for said second speed drive device and said second inlet passage of said second shift valve having a flow capacity controlling only the flow for said third speed drive device.

36. In a transmission; input means; output means; multispeed gear means connecting said input and output means and having in consecutive series a first, second and third increasing speed drive establishing devices; a source of fluid under pressure; first and second shift valve means each having first and second inlet passages, outlet passages and exhaust flow control passages; said first shift valve means having its first and second inlet passages connected to said source and its first outlet passage connected to said first speed drive device and operative in a downshift position to connect its first inlet passage, which has a flow control portion only for first speed establishment, to its first outlet passage to feed and establish said first speed device and connect its second outlet passage to its second exhaust flow control passage, to control only second speed disengaging exhaust on a second first shift, and in an upshift position to connect its second inlet passage for feed flow to its second outlet passage and its first outlet passage to its first exhaust flow control passage to control only first speed disengaging exhaust on a first second shift; and said second shift valve means having its first and second inlet passages, both connected to said second outlet passage of said first shift valve means, having respectively first and second flow control portions only for second and third speed establishment, said first flow control portion having a bypass blocking feed flow and permitting return flow, its first outlet passage connected to said second speed drive device and its second outlet passage connected to said third speed drive device and being operative in a downshift position to connect its second outlet to its second exhaust flow control passage to control only third sped exhaust on a three two shift, its first inlet passage, when the first shift valve means is upshifted, for feed to its first outlet passage for feed to establish said second speed drive device and, when said first shift valve means is downshifted for exhausting said second speed device through said bypass and first inlet passage of said second shift valve means to the second outlet and second exhaust flow control passage, of said first shift valve means to control only second speed exhaust on a second first shift, and in an upshift position to connect its second inlet passage to its second outlet passage for feed to said third speed drive device and connecting said second speed drive device by its first outlet passage to its first exhaust flow control passage only for second speed exhaust on a two three shift, the first inlet passage flow control portions of said first and second shift valve means and the second inlet passage flow control portion of said second shift valve respectively controlling only the feed flow for establishing said first, second and third speed drives, said first and second exhaust flow control passages of said first shift valve means controlling respectively only exhaust flow for disestablishing said first speed drive on a first to second shift and for disestablishing second speed drive on a two one shift, the first and second exhaust flow control passages of said second shift valve means controlling respectively only exhaust flow for disestablishing said second speed drive on a second to third shift and for disestablishing said third speed drive on a three two shift.

* * * * *

PO-1050
(5/69)

UNITED STATES PATENT OFFICE
CERTIFICATE OF CORRECTION

Patent No. 3,691,872          Dated    September 19, 1972

Inventor(s)  Robert H. Schaefer et al

It is certified that error appears in the above-identified patent and that said Letters Patent are hereby corrected as shown below:

In the Specification: Column 1, line 4, "not" should be -- now --; Column 1, line 40, "hole" should be -- hold --; Column 4, line 67, "shown" should be -- show --; Column 6, line 9, "93" should be -- 92 --; Column 6, line 64, "elements" should be -- element --; Column 11, line 35, "to" first occurrence should be -- two --; Column 12, line 24, "334" should be -- 344 --; Column 15, line 23, "to-three" should be -- two-three--; Column 18, line 35, "three," should be -- two-three, --; Column 20, line 5, "two," should be -- one-two, --; Column 23, line 1, "of" should be inserted after "movement"; In the Claims: Claim 36, column 35, line 2, "sped" should be -- speed --.

Signed and sealed this 1st day of May 1973.

(SEAL)
Attest:

EDWARD M. FLETCHER, JR.           ROBERT GOTTSCHALK
Attesting Officer                 Commissioner of Patents